United States Patent [19]

Maeda

[11] Patent Number: 4,974,071
[45] Date of Patent: Nov. 27, 1990

[54] COLOR IMAGE DATA ENCODING APPARATUS HAVING IMPROVED RESOLUTION/EFFICIENCY CHARACTERISTICS

[75] Inventor: Mitsuru Maeda, Yokohama, Japan

[73] Assignee: Canon Kabushiki Kaisha, Tokyo, Japan

[21] Appl. No.: 185,024

[22] Filed: Apr. 22, 1988

[30] Foreign Application Priority Data

| Apr. 28, 1987 | [JP] | Japan | 62-103001 |
| Apr. 28, 1987 | [JP] | Japan | 62-103002 |
| Apr. 28, 1987 | [JP] | Japan | 62-103003 |

[51] Int. Cl.⁵ .......................... H04N 1/41; G03F 3/08
[52] U.S. Cl. ...................................... 358/80; 358/75; 358/13
[58] Field of Search .................. 358/75, 78, 80, 260, 358/13

[56] References Cited

U.S. PATENT DOCUMENTS

| 4,667,250 | 5/1987 | Murai | 358/75 |
| 4,682,215 | 7/1987 | Adachi | 358/75 |
| 4,887,151 | 12/1989 | Wataya | 358/75 |

FOREIGN PATENT DOCUMENTS

| 286286 | 10/1988 | European Pat. Off. |
| 102825 | 8/1979 | Japan . |
| 9282 | 1/1988 | Japan . |
| 84267 | 4/1988 | Japan . |
| 184476 | 7/1988 | Japan . |
| 184478 | 7/1988 | Japan . |

*Primary Examiner*—Howard W. Britton
*Assistant Examiner*—Kim Y. Vu
*Attorney, Agent, or Firm*—Fitzpatrick, Cella, Harper & Scinto

[57] ABSTRACT

An apparatus for encoding color image data containing luminance information and color information in the unit of each block of predetermined size, by detecting the edge of the color image data in the block based on the luminance information and forming a code of a fixed length in response to the edge detection. The luminance information and the color information are coded into codes of different lengths according to the presence of absence of an edge, and codes are formed from the code of fixed length and codes of different lengths.

43 Claims, 19 Drawing Sheets

FIG. 25

| Sa | Sb | CONTENT OF $C_1$—$C_4$ | AVERAGE OF $a*$ (QUANTITY OF INFORMATION) | AVERAGE OF $b*$ (QUANTITY OF INFORMATION) |
|---|---|---|---|---|
| 0 | 1 | $C_{b1}$—$C_{b4}$ | $m_a$ (8 BITS) | $m_{b1}$ (4 BITS)<br>$m_{b2}$ (4 BITS) |
| 1 | 0 | $C_{a1}$—$C_{a4}$ | $m_{a1}$ (4 BITS)<br>$m_{a2}$ (4 BITS) | $m_b$ (8 BITS) |
| 1 | 1 | $C_{a1}$—$C_{a4}$ | $m_{a1}$ (4 BITS)<br>$m_{a2}$ (4 BITS) | $m_{b1}$ (4 BITS)<br>$m_{b2}$ (4 BITS) |
| 0 | 0 | 0 BIT | $m_a$ (8 BITS) | $m_b$ (8 BITS) |

COLOR IMAGE DATA ENCODING APPARATUS HAVING IMPROVED RESOLUTION/EFFICIENCY CHARACTERISTICS

BACKGROUND THE INVENTION

1. Field of the Invention

The present invention relates to an apparatus for encoding color image data obtained from a color image reader or a color television camera.

2. Related Background Art

In the transmission or storage of image information, it is customary to reduce the redundancy of said information by encoding, in order to improve the efficiency of said transmission or storage. Such encoding has mostly been applied to binary black-and-white or color information.

However, multi-level image information is being employed in recent years for reproducing finer images, and multi-level color information also has started to be used.

The encoding of such multi-level color image information has been conducted by applying the conventional encoding method for black-and-white information to each of three primary colors of red (R), green (G) and blue (B), or by quantization utilizing mutual correlation of three primary colors. The former method is naturally inefficient and may result in color aberration. The latter method is generally free from color aberration, but cannot provide a high efficiency because the correlation of three primary colors is too strong.

The present applicant therefore proposed, in U.S. Patent Application Ser. No. 066,119 filed on June 25, 1987, a process of encoding color image data containing color information and luminance information in each block of pixels.

Said encoding process for color image data separates the color image data into the luminance information and the color information, and encodes each said information into a code of a fixed length.

Human vision can distinguish an image of a high resolution from an image of continuous tone. When a color image having such mutually opposite properties is encoded with a fixed encoding process explained above, the compression efficiency of encoding is improved but the human visual characteristic is sacrificed if the length of code is selected to be too short. For example if the color information does not contain information on resolution, or particularly if the block contains an edge therein, there may result mixing of colors or failure in reproducing fine lines. On the other hand, a larger length of codes will provide an image matching closer to the human visual characteristic but reduces the efficiency of compression.

SUMMARY OF THE INVENTION

In consideration of the foregoing, an object of the present invention is to provide a color image data encoding apparatus of higher efficiency and reduced deterioration of visual quality of the image.

Another object of the present invention is to provide a color image data encoding apparatus capable of encoding according to the characteristics of the image to be encoded.

Still another object of the present invention is to provide a color image data encoding apparatus capable of encoding matching the image, according to whether the image to be encoded contains an edge in luminance or in color.

The foregoing and still other objects of the present invention, and the advantages thereof, will become fully apparent from the following description.

BRIEF DESCRIPTION OF THE DRAWINGS

FIG. 25 is a chart showing an example of encoding format for color information in the presence of a color edge in the third embodiment.

DETAILED DESCRIPTION OF THE PREFERRED EMBODIMENTS

In the following the present invention will be clarified in detail by three embodiments thereof shown in FIGS. 1 to 25.

First embodiment (Pixel block)

Figure 2:
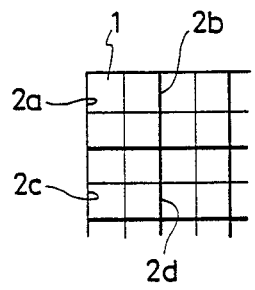
FIGS. 2 and 3 are schematic views showing pixel blocks employed in first to third embodiments.
Figure 3:
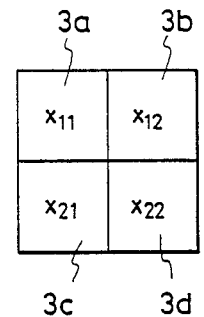

For simplifying the explanation, the pixel block in the first embodiment is composed of 2×2 pixels. FIG. 2 shows the mode of dividing image into pixel blocks, and illustrates 4-blocks (2a-2d) wherein a color pixel 1 contains information of red (R), green (G) and blue (B) representing primary color stimulations in plural bits (hereinafter called multivalue information). For the purpose of simplicity, each signal R, G or B is assumed to have 8 bits. Consequently a color pixel contains information of 24 bits. FIG. 3 shows the arrangement of such color pixels 3a–3d in a block shown in FIG. 2. The color pixels 3a, 3b, 3c and 3d in the block respectively have color image data $X_{11}$, $X_{12}$, $X_{21}$, $X_{22}$ which are multi-value information of R, G and B as explained above. It is assumed that the color data $X_{11}$ contains red information $R_{11}$, green information $G_{11}$ and blue information $B_{11}$ and that structure is similar for the data $X_{12}$, $X_{21}$ and $X_{22}$, so that:

$$X_{11} = \{R_{11}, G_{11}, G_{11}\}$$

$$X_{12} = \{R_{12}, G_{12}, B_{12}\}$$

$$X_{21} = \{R_{21}, G_{21}, B_{21}\}$$

$$X_{22} = \{R_{22}, G_{22}, B_{22}\}$$

(Outline of first embodiment)

Figure 1:
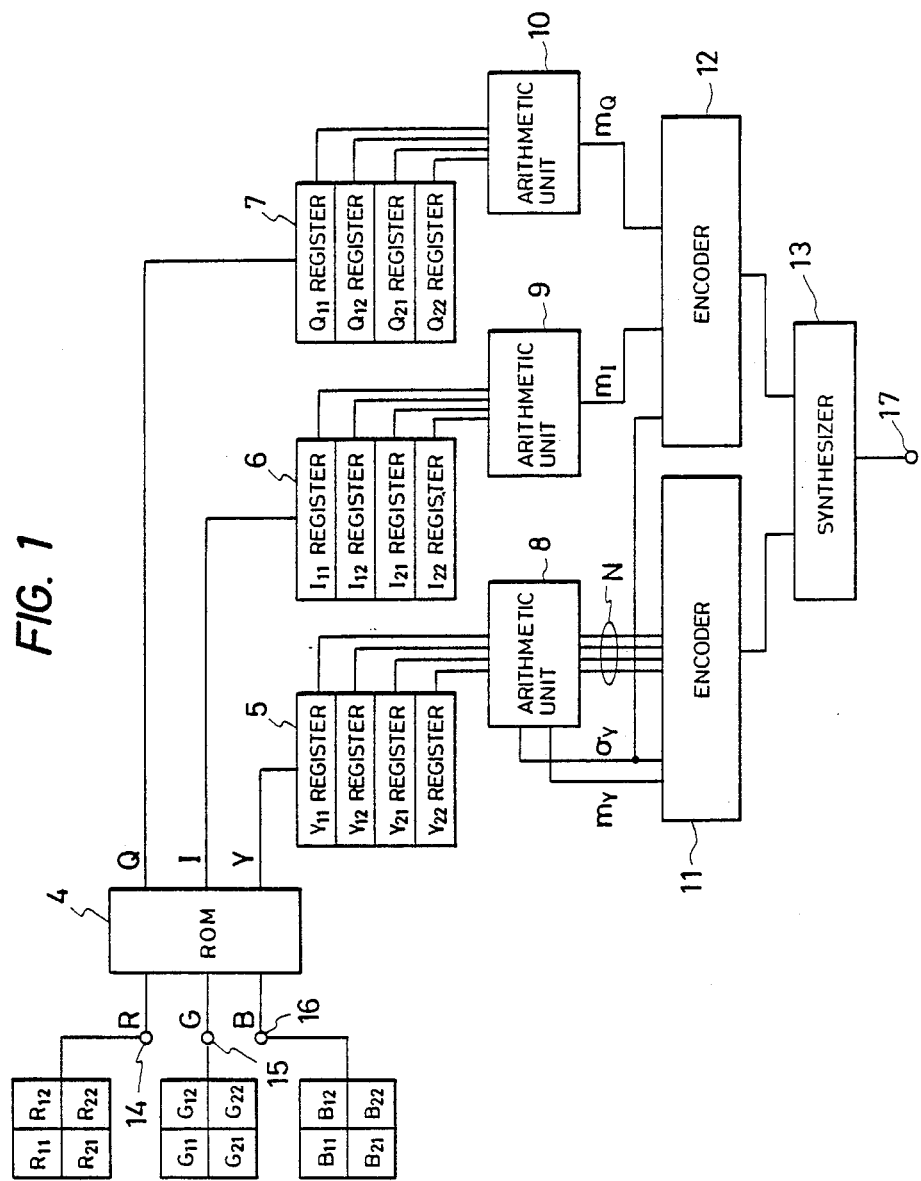
FIG. 1 is a block diagram of an encoding circuit constituting a first embodiment.
Figure 9A:
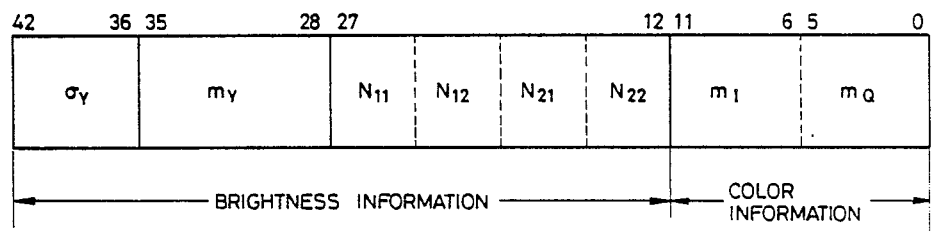
FIGS. 9A and 9B are charts showing the encoding format in the first embodiment.
Figure 9B:
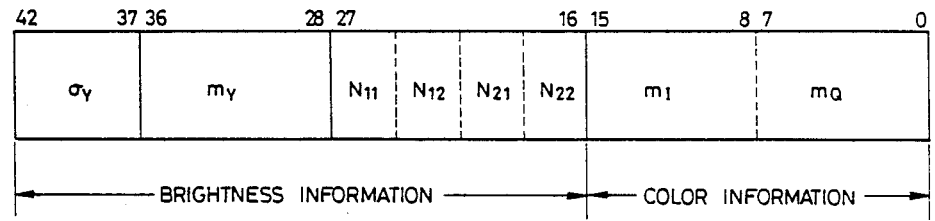

FIG. 1 is an entire block diagram of an encoding apparatus constituting a first embodiment, which is adapted to encode each block of 4 pixels to obtain codes as shown in FIG. 9A or 9B according to the characteristic of said block. In this encoding process, the R-G-B signals are converted by a ROM 4 into a luminance signal Y and color difference signals IQ, which are respectively supplied through registers 5, 6, 7 and subjected to the extraction of characteristics by arithmetic units 8, 9, 10. These signals are then encoded in two ways by encoders 11, 12 (encoder 11 with a format shown in FIG. 9A and encoder 12 with a format shown in FIG. 9B), and either of thus encoded codes is released from a synthesizer 13 to a terminal 17.

Figure 4:
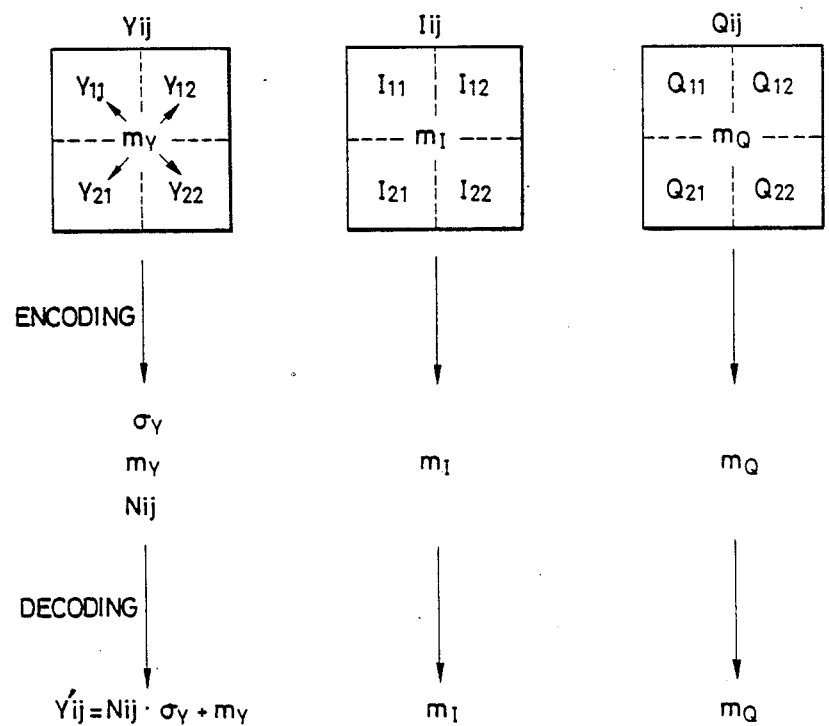
FIG. 4 is a view showing the results of encoding and decoding in the first embodiment.

FIG. 4 shows, in combination with FIGS. 9A and 9B, the outline of encoding in the first embodiment. For facilitating the understanding of features of FIG. 4 also shows the decoding process. In FIG. 4, $m_Y$ is the average luminance in the block; $\sigma_Y$ is the edge information on luminance in the block (standard deviation of $Y_{ij}$ in the present embodiment); and $N_{ij}$ is the change in luminance from the center of block (with luminance $m_Y$) to the direction of each pixel, normalized with the standard deviation $\sigma_Y$, i.e. $N_{ij} = (Y_{ij} - m_y)/\sigma_Y$. Consequently decoding provides following signals:

$$Y_{ij}' = N_{ij} \cdot \sigma_Y + m_Y$$

$$I_I' = m_I$$

$$I_Q' = m_Q$$

The circuit shown in FIG. 1 is so constructed to achieve the encoding explained above.

(Conversion from RGB to YIQ)

Again referring to FIG. 1, a read-only memory (ROM) 4 is used for converting the R-G-B signals into Y-I-Q signals by a table. Y, I and Q are luminance signal Y and color difference signals I and Q commonly employed as television signals. Said signal converting ROM 4 employs R, G, B signals as input addresses and releases Y, I, Q signals as the output data. In the following it is assumed that the signals Y, I, Q calculated from $X_{11}$ are indicated respectively by $Y_{11}$, $I_{11}$ and $Q_{11}$, and similar notations are used for $X_{12}$, $X_{21}$ and $X_{22}$.

Registers 5, 6, 7 are respectively used for storing the information Y, I and Q of a block converted by the ROM 4. These registers 5, 6, 7 fetch the information $Y_{11}$–$Y_{22}$, $I_{11}$–$I_{22}$ and $Q_{11}$–$Q_{22}$ in succession, calculated from the information $X_{11}$, $X_{12}$, $X_{21}$ and $X_{22}$.

(Extraction of characteristics)

Figure 5:
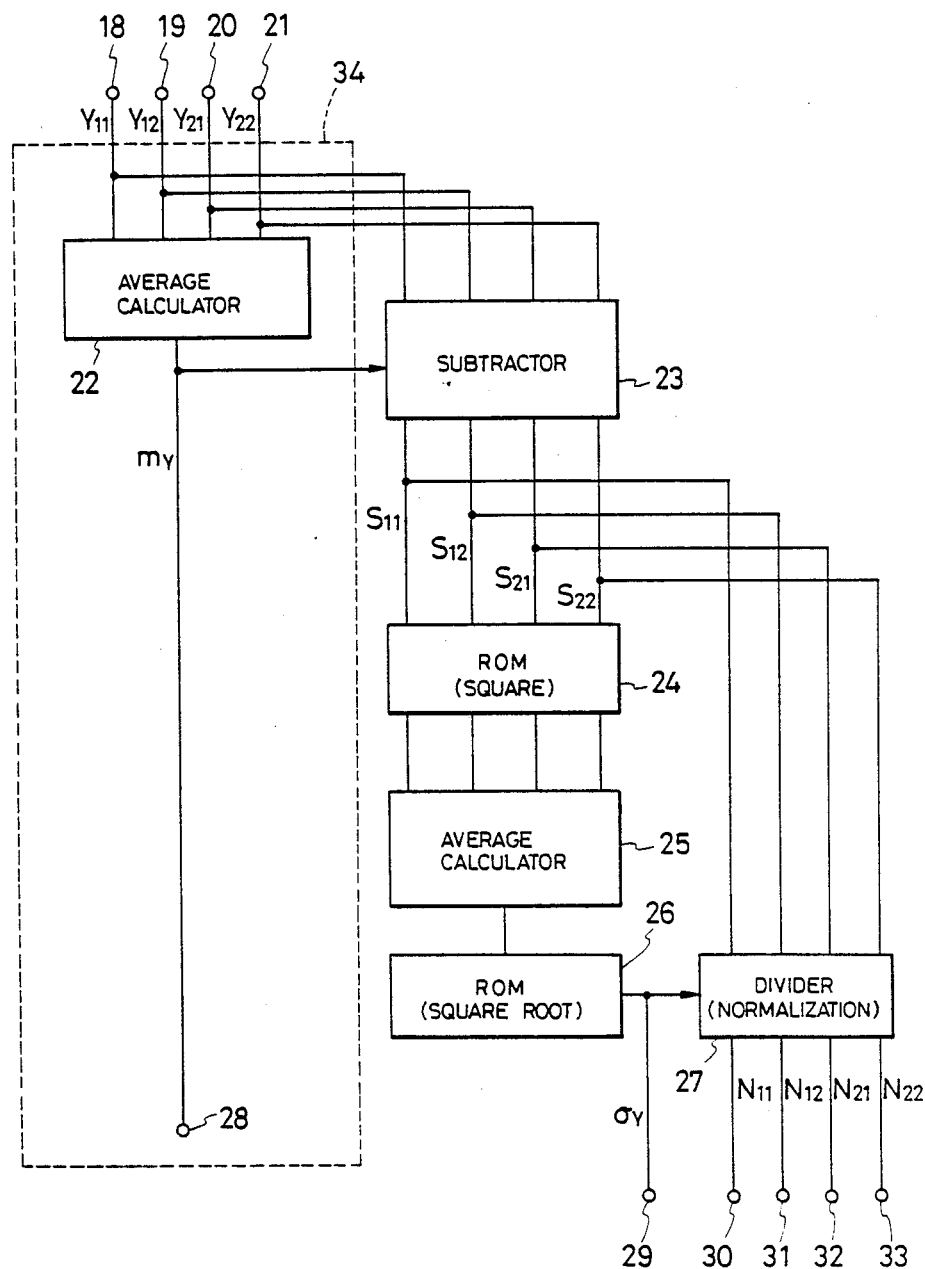
FIG. 5 is a block diagram showing the structure of an arithmetic unit in the first embodiment.

All the information $X_{11}$–$X_{22}$ of a block are temporarily stored in the registers 5–7 and supplied to the arithmetic units 8–10, which are constructed as shown in FIG. 5. More specifically, the arithmetic unit 8 has a structure as shown in FIG. 5, while the arithmetic unit 9 or 10 has a structure indicated by a broken line 34 in FIG. 5, including an average calculator 22.

The arithmetic unit 8 calculates the average value $m_Y$ of the signal Y in the block; edge information $\sigma_Y$ on luminance; and change in luminance from said average value $m_Y$ to each pixel $Y_{11}$–$Y_{22}$, normalized by said value $\sigma_Y$. The arithmetic units 9, 10 respectively calculate the average value $m_I$ of the information I in the block and the average value $m_Q$ of the information Q in the block.

In the following there will be given an explanation on the arithmetic unit, taking the circuit 8 for extracting the characteristic of the Y information as an example. Terminals 18, 19, 20 and 21 respectively receive the information $Y_{11}$, $Y_{12}$, $Y_{21}$ and $Y_{22}$. The average calculator 22 adds all these information and divides the obtained sum by the number (4) of input information, by shifting the lower two bits of the output of the average calculator 22 off to the lower side. Consequently the output $m_Y$ of the average calculator 22 can be represented as:

$$m_Y = \sum_{ij}^2 Y_{ij}/4$$

As explained above, the calculator 9 or 10 is composed of a circuit surrounded by a broken line 34 in FIG. 5 and releases, from an output terminal 28, an average value $m_I$ or $m_Q$ of the information I or Q in the block.

In the following there will be explained the edge information $\sigma_Y$ on luminance, calculated by the calculator 8. In the present first embodiment, the standard deviation in the block is utilized as the edge information $\sigma_Y$. For determining said standard deviation $\sigma_Y$ there are employed a subtractor 23, ROM's 24, 26 and the average calculator 25, and the value $\sigma_Y$ from the ROM 26 is calculated by:

$$\sigma_Y^2 = \left\{ \sum_{ij}^2 (Y_{ij} - m)^2/4 \right\}^{\frac{1}{2}}$$

wherein i = 1, 2; j = 1, 2.

The subtractor 23 receives the pixel luminance information $Y_{11}$–$Y_{22}$ as the value to be subjected to subtraction, and the block average value $m_{TY}$ as the value to be subtracted. Thus the subtractor 23 releases differences $S_{ij}$ of the pixel luminance information $Y_{ij}$ and the average $m_Y$, i.e.:

$$S_{ij} = Y_{ij} - m$$

wherein $i=1, 2; j=1, 2$.

Said differences $S_{ij}$ are supplied to a ROM 24 for obtaining the square of the input. The output of said ROM 24 is the square of the difference $S_{ij}$ for each pixel, so that:

$$S_{ij}^2 = (Y_{ij} - m)^2$$

wherein $i=1, 2; j=1, 2$.

The squares of said pixel differences $S_{ij}$ are supplied to the average calculator 25 to obtain an output:

$$\sigma_Y^2 = \sum_{ij} S_{ij}^2 / 4$$

which represents the dispersion in the block. The obtained result is supplied to a ROM 26 for obtaining the square root of the input. Consequently there is obtained an output:

$$\sigma_Y = \left( \sum_{ij} S_{ij}^2 / 4 \right)^{\frac{1}{2}}$$

representing the standard deviation in the block. This value is released, as the edge information $\sigma$ on luminance, from a terminal 29. The ROM's 24, 26 mentioned above can be composed of look-up table ROM's.

In the first embodiment, said value $\sigma_Y$ is used for discriminating the presence or absence of an edge in the block.

In the following there will be explained a method of normalizing the information $Y_{11}$–$Y_{22}$. The above-mentioned subtractor 23 releases the differences $S_{11}$–$S_{22}$ between the average $m_Y$ and the data $Y_{11}$–$Y_{22}$, and said differences are divided in a divider 27 with the standard deviation $\sigma_Y$ quotients:

$$N_{ij} = S_{ij} / \sigma_Y$$

However, if the standard deviation $\sigma_Y$ is zero, $N_{ij}$ is taken as zero. The standard deviation $\sigma_Y$ indicates the average fluctuation of the pixels. Thus the quotient $N_{ij}$ obtained by dividing $S_{ij}$ with $\sigma_Y$ is considered to represent the inclination of luminance from the center of the block to each pixel, as shown in FIG. 4. The value $S_{ij}$ is also considered as an inclination, but the value $N_{ij}$ normalized with $\sigma_Y$ indicates an inclination not dependent on the block size. The value $N_{ij}$ has 9 bits in consideration of the fact that each of the signals Y, I, Q has 8 bits.

Terminals 30, 31, 32 and 33 respectively release normalized values $C_{11}$, $C_{12}$, $C_{21}$, $C_{22}$ of the values $Y_{11}$, $Y_{12}$, $Y_{21}$, $Y_{21}$, $Y_{22}$.

(Encoding)

The output signals $m_Y$, $\sigma_Y$, $N_{ij}$ from the arithmetic unit 8 are supplied to the encoder 11, while the output signals $m_I$, $m_Q$ from the arithmetic units 9, 10 and the above-mentioned signal $\sigma_Y$ are supplied to the encoder 12 (cf. FIG. 1).

Figure 6:
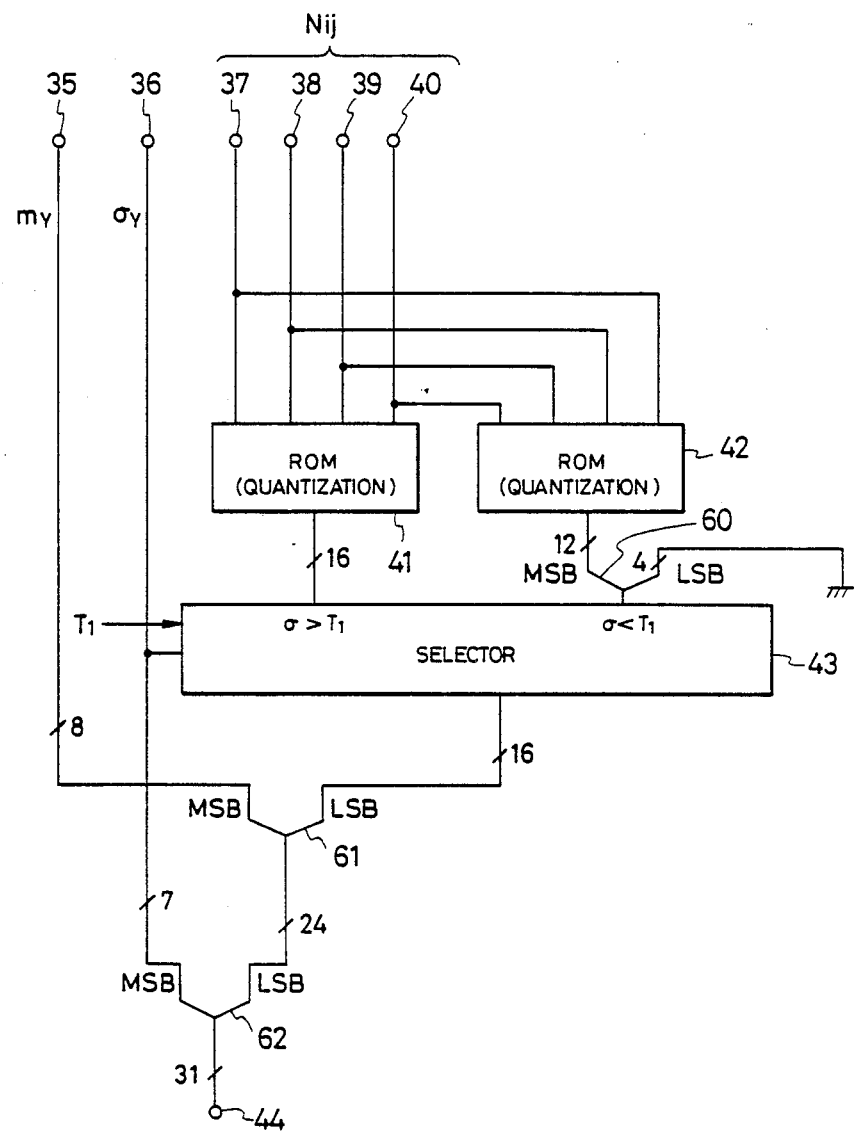
FIG. 6 is a block diagram showing the structure of an encoder 11 in the first embodiment.

FIG. 6 is a block diagram of the encoder 11 for the luminance information, consisting of ROM's 41, 42 and a selector 43. Terminals 37–40 receive the output signals $N_{ij}$ from the arithmetic unit 8 shown in FIG. 5. An input terminal 35 receives the average luminance $m_Y$, and an input terminal 36 receives the edge information $\sigma_Y$. The ROM's 41, 42 respectively digitize the normalized input values $N_{11}$–$N_{22}$ into several levels. When each of the signals R, G, B has 8 bits as explained before, each of the signals Y, I, Q has 8 bits, and each of the normalized values $N_{11}$–$N_{22}$ has an information capacity of 9 bits (or 512 levels). The ROM 41 digitizes each of the normalized $N_{ij}$ into equally divided 16 levels (=4 bits) while the ROM 42 digitizes it into equally divided 8 levels (=3 bits), thereby reducing the amount of information. The level of digitization is selected differently in the ROM 41 and 42, because a rougher digitization is acceptable if the block does not contain an edge structure. Consequently the output from the ROM 41 has a length of 16 bits, containing $N_{11}$, $N_{12}$, $N_{21}$, $N_{22}$ in this order, and the output from the ROM 42 has a length of 12 bits.

The output of the ROM 41 is supplied to the selector 43, while the output of 12 bits from the ROM 42 is supplied, after adding 4 bits "0000" at the end, to the selector 43. Said selector 43 selectively releases either one of said outputs of the ROM's 41, 42 according to the magnitude of the luminance edge information $\sigma_Y$ in the following manner:

$N_{ij}$ 4-bit digitization ($\sigma_Y > T_1$)

$N_{ij}$ 3-bit digitization ($\sigma_Y < T_1$)

wherein $T_1$ is a predetermined threshold value. The method of digitization is varied, as explained above, according to the magnitude of $\sigma_Y$, and the levels of digitization of the information related to luminance (particularly $N_{ij}$) is made finer if the luminance in the block is identified to contain a large change, based on the luminance information Y. On the other hand, if the block does not contain a large change in the luminance, the amount of luminance information is reduced, thereby allowing to increase the amount of color information.

Then the average luminance information $m_Y$ (8 bits) in the block is added above the uppermost bit of thus selected output of the selector 43, and the luminance edge information $\sigma_Y$ (7 bits) in the block is further added thereabove. Thus the luminance information of 31 bits in total is released from a terminal 44. In FIG. 6, a symbol "MSB$^V$LSB" indicates a shifter. For example a shifter 63, arranges the input data of the MSB side in the order of inputs, and then the input data of the LSB side in succession of the above-mentioned input data of MSB side.

Figure 7:
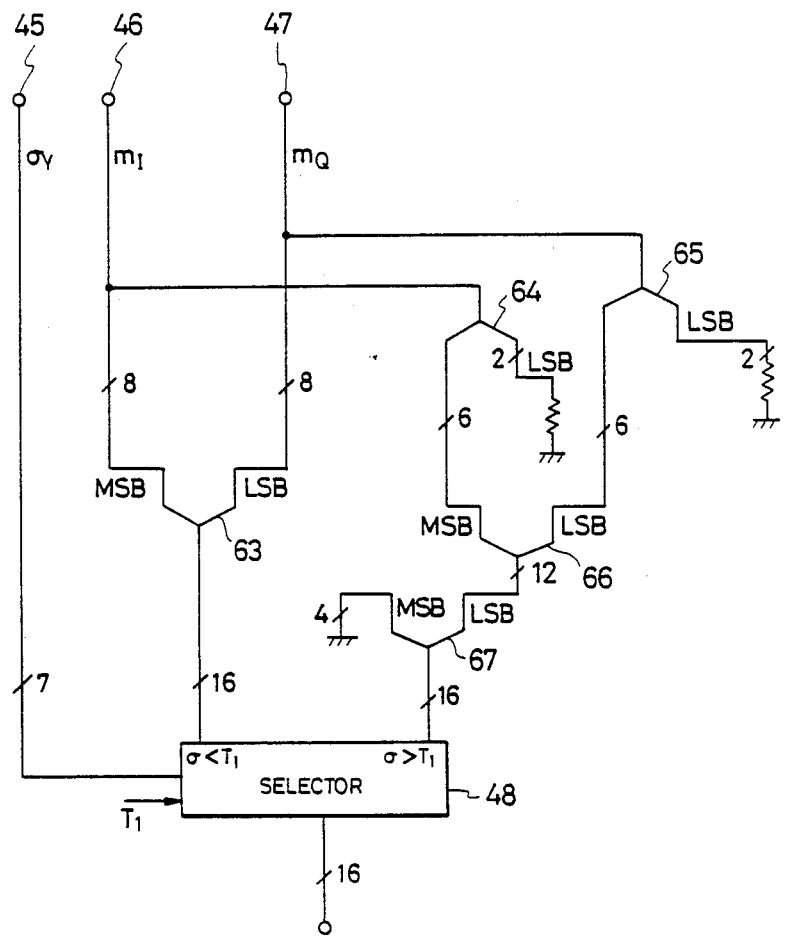
FIG. 7 is a block diagram showing the structure of an encoder 12 in the first embodiment.

FIG. 7 is a block diagram of the encoder 12 (FIG. 1) for encoding the color information I, Q.

A terminal 46 receives the average $m_I$ of the information I in the block, received from the arithmetic unit 9 (FIG. 1), and a terminal 47 receives the average $m_Q$ of the information Q in the block. An input to a selector 48 is the values $m_I$ and $m_Q$ combined in the order of I and Q. The combined values has 16 bits since $m_I$ and $m_Q$ are respectively 8 bits. The other input of the selector 48 is obtained by deleting lower 2 bits from each of the averages $m_I$, $m_Q$ in shifters 64, 65; combining thus shortened averages in the order of I, Q from the upper bit in a shifter 65; and adding 4 bits of "0" above the uppermost bit. The selector 48 selects these two inputs according to the magnitude of the edge information $\sigma_Y$ in the following manner:

average values $m_I$, $m_Q$:

6-bit digitization ($\sigma > T_1$)

8-bit digitization ($\sigma < T_1$)

Thus, if the edge information $\sigma_Y$ is larger than a predetermined threshold value $T_1$, there is selected the latter input composed of the averages $m_I$, $m_Q$ of 6 bits each with 4 bits of "0" at the top. On the other hand, if $\sigma_Y$ is smaller than said threshold value $T_1$, there is selected the former input composed of the averages $m_I$, $m_Q$ of 8 bits each. In this manner the amount of color information is made smaller or larger respectively if the luminance information indicates the presence or absence of a large change of luminance in the block.

The output of said selector 48 serves as an input to the synthesizer 13 shown in FIG. 1.

(Synthesis)

Figure 8:
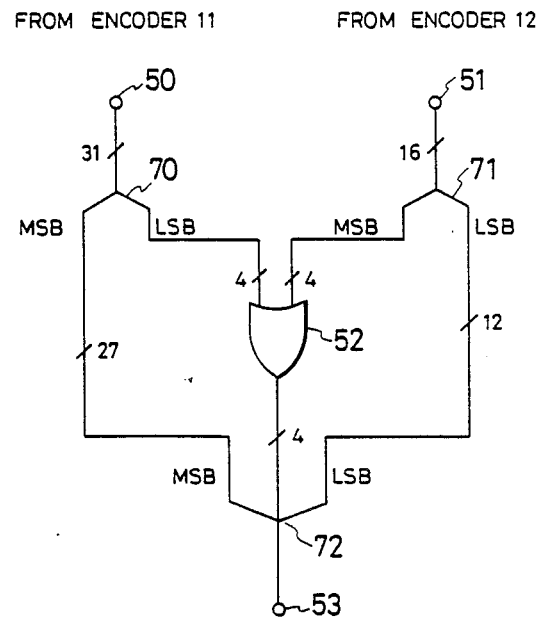
FIG. 8 is a block diagram showing the structure of a synthesizer 13 in the first embodiment.

The outputs of the encoders 11, 12 are supplied to the synthesizer 13, of which structure is shown in FIG. 8. A terminal 50 receives the encoded luminance information from the encoder 11, while a terminal 51 receives the encoded color information from the encoder 12. A shifter 70 extracts the lower four bits of the luminance information while a shifter 71 extracts the upper four bits of the color information, and an OR gate 52 calculates the logic sums of said four bits from the uppermost bit.

Thus, if the luminance edge information $\sigma_Y$ is larger than said threshold value $T_1$, the four least significant bits from the shifter 70 contain useful luminance information while the four most significant bits from the shifter 71 are all "0", so that the output of the OR gate 52 is useful information of 4 bits on luminance. On the other hand, if $\sigma_Y$ is smaller than said threshold value $T_1$, the least significant bits from the shifter 70 are all "0" while the most significant bits from the shifter 71 contain useful color information, so that the output of the OR gate 52 is useful information of 4 bits on color.

A shifter 72 places the luminance information without the lowermost four bits (27 bits) in the uppermost position, then the output of the OR gate 52 (4 bits), and the color information without the uppermost four bits (12 bits) in the lowermost position. The encoding is terminated by releasing thus obtained codes from a terminal 53.

FIGS. 9A and 9B show the arrangement of thus obtained codes of 43 bits, respectively when the edge information $\sigma_Y$ is larger or smaller than the threshold value $T_1$ wherein numbers indicate bit positions.

(Decoding)

Decoding in the first embodiment can be achieved in the opposite order of the above-explained procedure. At first the 36th –42nd bits ($\sigma_Y$) at the uppermost position of the input code are extracted and compared with the above-mentioned threshold value $T_1$ to check whether the block contains a large change in the luminance, thereby discriminating whether the bit arrangement of the code belongs to that shown in FIG. 9A or that shown in FIG. 9B. Then the 35th –28th bits are extracted as the average $m_Y$ of the luminance information Y.

Then the data $N_{11}-N_{22}$, normalized from the information $Y_{11}$, $-Y_{22}$ of the pixels are extracted either by 4 bits when the block contains a large change in luminance (FIG. 9A) or by 3 bits when the block does not contain a large change (FIG. 9B). The remaining bits are divided into two, and the upper ones are obtained as the average $m_I$ of the information I in the block, and the lower ones are obtained as the average $m_Q$ of the information Q in the block.

Thus, the regenerated signals Y, I, Q for each pixel, represented as $Y_{11}'-Y_{22}'$, $I_{11}'-I_{22}'$ and $Q_{11}'-Q_{22}'$, are obtained as follows:

$$Y_{ij}' = N_{ij} \times \sigma_Y + m_Y$$

$$I_{ij}' = m_I$$

$$Q_{ij}' = m_Q$$

wherein i=1, 2; j=1, 2.

Also the signals Y, I, Q are converted into the regenerated signals R', G', B' by a table ROM. The decoding is thus conducted by the inverse procedure of the encoding.

(Variation of first embodiment)

In the first embodiment explained above, the edge information on luminance is composed of the standard deviation in the block, but it is also possible to simplify the circuit structure by employing the difference between the maximum and minimum values in the block. Also the form of signals to be encoded is not limited to the Y-I-Q television signals in the foregoing embodiment but can naturally be other information form containing luminance information and color information, such as signals L*, a*, b* in the CIE 1976 (L*, a*, b*) space. Also in the foregoing embodiment, there is employed an encoding by bit skipping, but there may naturally be employed other encoding methods such as vector digitizing.

(Effect of first embodiment)

The first embodiment encodes the information of 96 bits per block into 43 bits, thus achieving a compression rate of 44.8%. Also an encoding of fixed code length independently for the luminance information and the color information will require 31 bits for the luminance information and 16 bits for the color information, or 47 bits in total, but the encoding according to the presence or absence of edge enables an encoding capable of further reducing 4 bits with reduced visual deterioration of the image quality.

Thus, in an encoding with a fixed code length in total, by dividing a color image into plural pixel blocks and separating each block into luminance information and color information:

1) The encoding of a fixed code length in total can be conducted in variable manner by varying the size of luminance information and color information according to the amount of edge information (for example standard deviation) on luminance which can be easily obtained in the course of encoding. Thus the encoding can be achieved with a high efficiency, and without deterioration of image quality, utilizing the human visual characteristics;

2) Also since the encoding is conducted with a fixed code length for each block, the positional relationship of the pixels in the image can be maintained constant for example in case of storage in an image memory. Consequently the necessary memory capacity can be made constant for a predetermined image size, and in image processing the information of surrounding pixels can be easily extracted.

Second embodiment

Now there will be explained a second embodiment, while making reference to FIG. 10 and ensuing drawings.

(Outline of second embodiment)

In the foregoing first embodiment, a large change in the luminosity is identified from the standard deviation $\sigma_Y$ of the luminance Y, and the normalized information $N_{ij}$. In the present second embodiment, said large change in luminosity is identified in consideration also of the color information, for example IQ signals. FIG. 10 is an entire block diagram of an encoding apparatus of said second embodiment. Before entering FIG. 10, there will be explained the concept of encoding in the second embodiment while referring to FIG. 11A. This embodiment employs Y-I-Q color image data as in the first embodiment. Said Y-I-Q color image data for each block are encoded, as shown in FIG. 11, into (SEL, $\sigma_Y$, $m_Y$, $C_{ij}$), ($E_I$, $m_I$) and ($E_Q$, $m_Q$). $C_{ij}$ is a 1-bit code by further compression of $N_{ij}$ in the first embodiment, but has the same meaning. The bit arrangement after encoding is as shown in FIG. 17. Data $\sigma_Y$, $m_Y$, $m_I$ and $m_Q$ have basically same meaning as in the first embodiment, but are different in the number of bits of digitization.

The SEL is a one-bit signal which assumes a value "1" when the luminance edge information $\sigma_Y$ exceeds a threshold value, indicating that the pixel block contains an edge portion. Said SEL bit is added for the purpose of decoding, because the code length is variable in the present second embodiment while it is fixed in the first embodiment. The code $\sigma_Y$ has a variable length, and, the codes $m_Y$, $m_I$ and $m_Q$ have variable lengths according to the bit SEL.

Figure 11A:
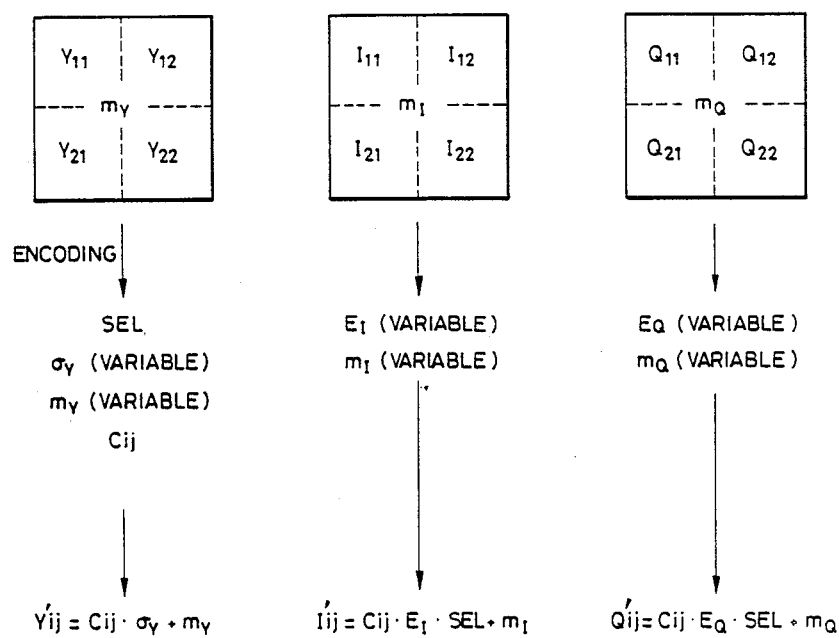
FIG. 11A is a view showing the results of encoding and decoding in the second embodiment.
Figure 11B:
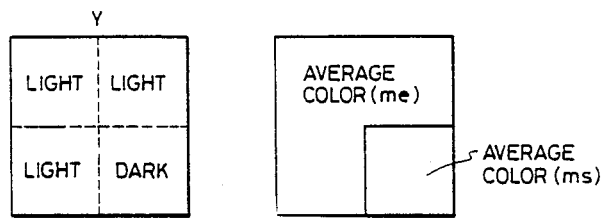
FIG. 11B is a view showing division of a block by an edge in the second embodiment.

FIG. 11B illustrates the concept of $E_I$ and $E_Q$ constituting a part of codes encoded from the image data I, Q. For example if the color image data Y in a block has a light portion and a dark portion as shown in FIG. 11B, the codes $E_I$, $E_Q$ respectively indicate differences from an average $m_l$ of I (or Q) corresponding to the light portion and an average $m_s$ of I (or Q) corresponding to the dark portion.

As $C_{ij}$ indicates the luminance distribution as shown in FIG. 11B, the luminance information can be decoded, as shown in the first embodiment, by:

$$Y_{ij}' = C_{ij} \cdot \sigma_Y + m_Y$$

The bit CEL is used, in decoding, for knowing the bit length of $\sigma_Y$ and $m_Y$. The color information IQ can be decoded by:

$$I_{ij}' = C_{ij} \cdot E_I \cdot SEL + m_I$$

$$Q_{ij}' = C_{ij} \cdot E_Q \cdot SEL + m_Q$$

If the block does not contain an edge, the SEL bit becomes equal to "0", so that:

$$I_{ij}' = m_I$$

$$Q_{ij}' = m_Q$$

which are same as in the first embodiment. Thus, when the SEL is "0" indicating the absence of a strong edge, the structural information $C_{ij}$, $E_I$ (or $E_Q$) etc. need not be encoded, and the number of digitizing levels of $m_I$ (or $m_Q$) can be accordingly increased to improve the reproducibility at decoding. On the other hand, when the SEL is "1", not only the luminance edge infromation but also the color edge information $E_I$ ($E_Q$) are encoded and decoded, so that the reproduction of resolution is improved in the second embodiment in comparison with the first embodiment.

(Circuit structure)

Figure 10:
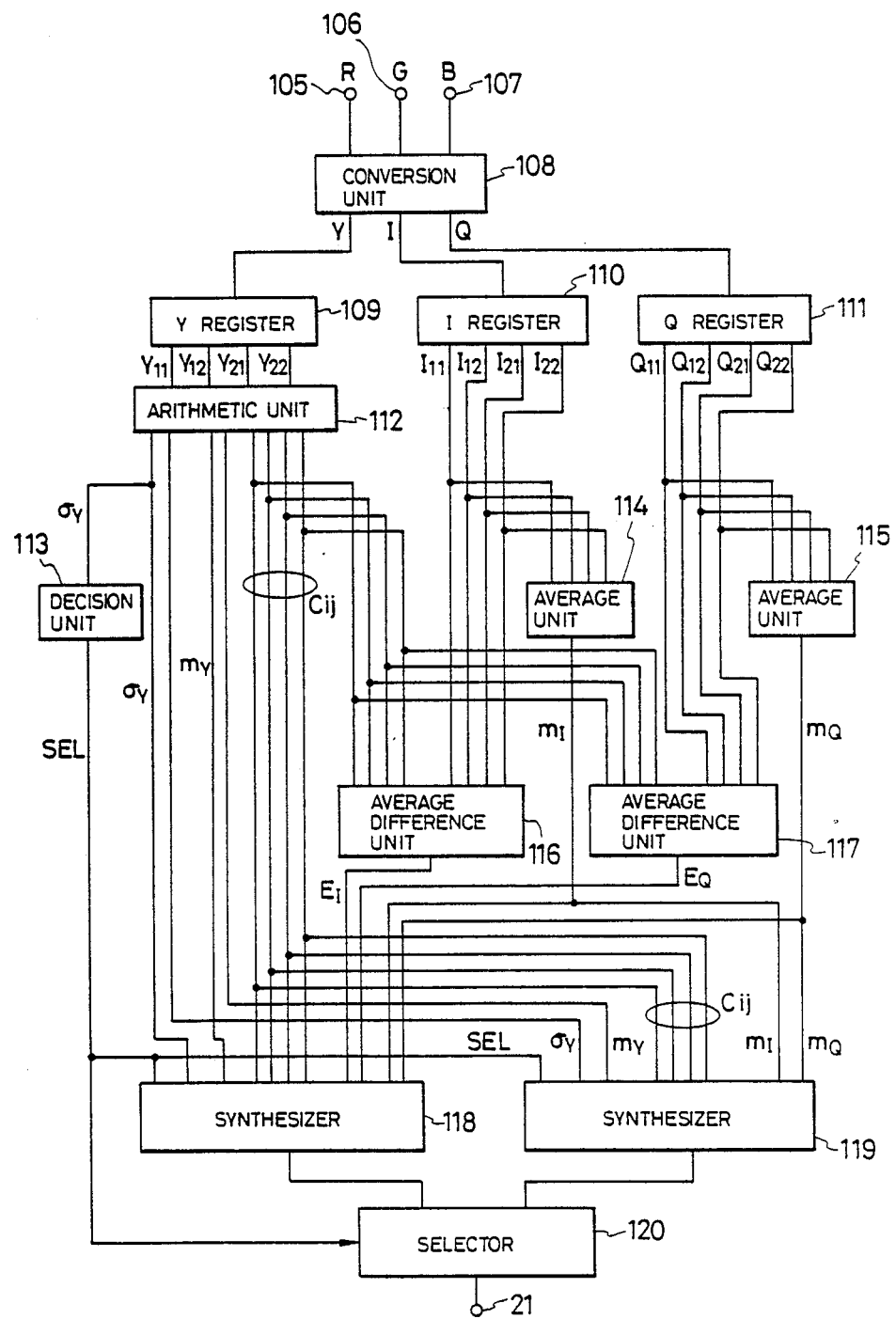
FIG. 10 is a block diagram showing the entire structure of a second embodiment.

FIG. 10 is an entire circuit diagram for executing the above-explained encoding. A terminal 105 receives the R-information, in the order of $R_{11}$, $R_{12}$, $R_{21}$ and $R_{22}$. Terminals 106 and 107 respectively receive the G-information and B-information in a similar manner. A conversion unit 108 separates the luminance information and the color information from the information R, G, B of each of 2×2 pixels constituting the block. The Y, I, Q signals obtained by said conversion are respectively stored in registers 109, 110, 111. The conversion unit 109 and the registers 109, 110, 111 are basically same as the ROM 4 and the registers 5, 6, 7 in the first embodiment.

An arithmetic unit 112 releases $\sigma_Y$, $m_Y$ and $C_{ij}$ mentioned above, while a decision unit 113 releases the signal SEL, and average units 114, 115 respectively release $m_I$ and $m_Q$ Also average difference units 116, 117 respectively release $E_I$ and $E_Q$ Synthesizers 118, 119 independently synthesize the above-mentioned signals respectively corresponding to the presence of an edge in the block and the absence thereof, and a selector 120 selects either the output of the synthesizer 118 or that of the synthesizer 119 according to the value of SEL signal.

(Pixel block)

The size of pixel block and the image data of each pixel in the block are same as those in the foregoing first embodiment, so that the explanation on FIGS. 2 and 3 is application also to the second embodiment.

The characteristics of the color image data Y, I, Q are extracted by the arithmetic unit 112, decision unit 113, average units 114, 115 and average difference unit 116, 117. (Characteristic extraction/encoding . . . Y information)

Figure 12:
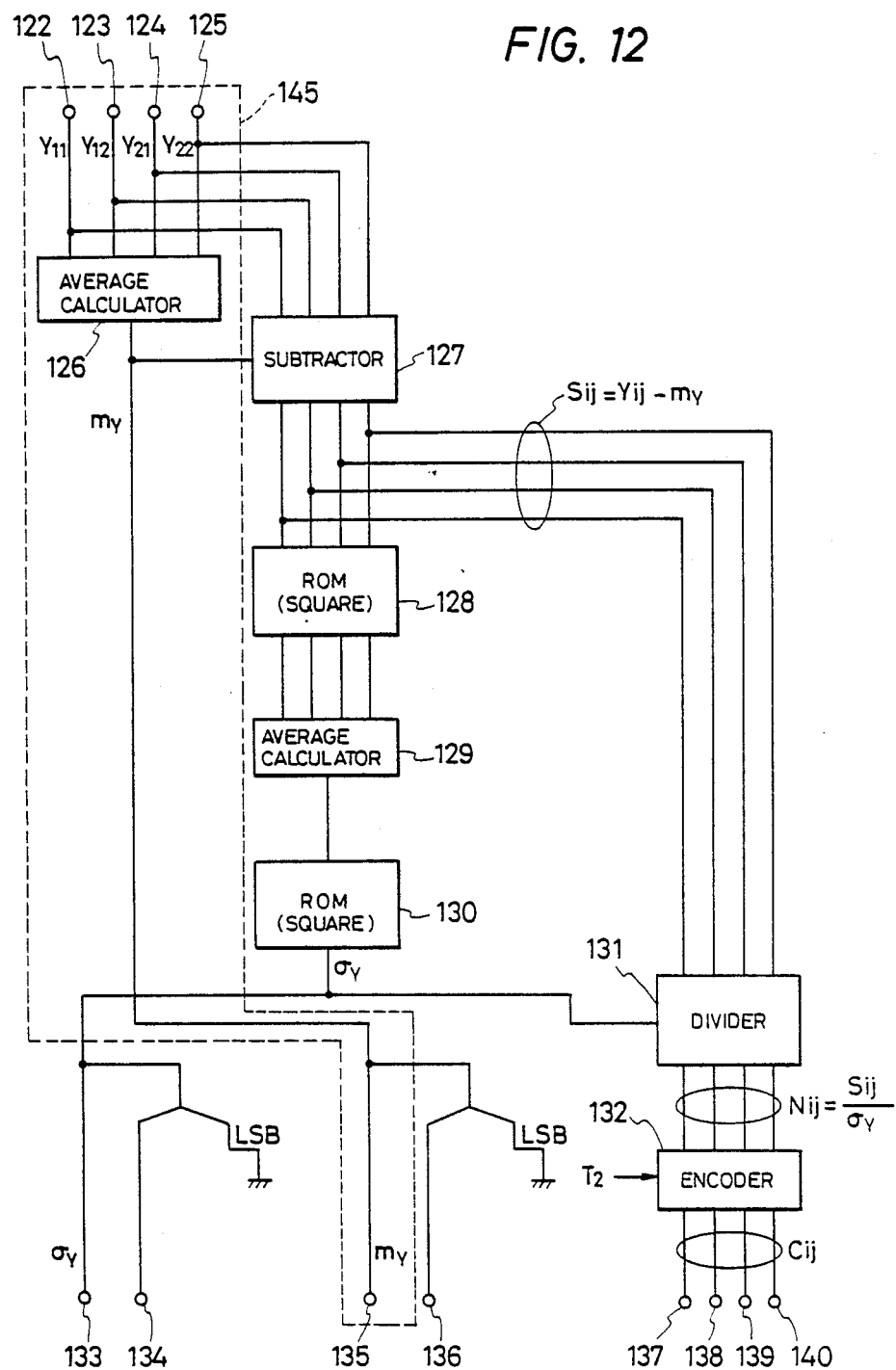
FIG. 12 is a block diagram showing the structure of an arithmetic unit 112 in the second embodiment.

FIG. 12 is a block diagram of the arithmetic unit 112 for characteristic extraction/encoding of the information Y. A portion surrounded by broken line in FIG. 12 is equivalent to the average unit 114 or 115. In FIG. 12, terminals 122, 123, 124 and 125 respectively receive the data $Y_{11}$, $Y_{12}$, $Y_{21}$ and $Y_{22}$. The average unit 126 adds these input data and divides the sum with the number of input data to obtain an average $m_Y$ represented by:

$$m_Y = \left( \sum_{ij}^2 Y_{ij}/4 \right)$$

wherein i=1, 2; j=1, 2.

Then a subtractor 127 subtracts the block average $m_Y$ from the data $Y_{ij}$ of each pixel to obtain differences:

$$S_{ij} = Y_{ij} - m_Y$$

Then the ROM 128, average unit 129 and ROM 130 determine the standard deviation in the block as follows:

$$\sigma_Y = \left\{ \left( \sum_{ij}^2 S_{ij}^2 \right)/4 \right\}^{\frac{1}{2}}$$

Finally there will be explained normalization of the data $Y_{11}$–$Y_{22}$. As in the first embodiment, a divider 131 calculates the normalized values $N_{ij}$ by:

$$N_{ij} = (Y_{ij} - m_Y)/\sigma_Y$$

An encoder 132 compares said values $N_{ij}$ with a predetermined threshold value $T_2$, and releases the normalized codes $C_{ij}$ by binary encoding as follows:

$$C_{ij} = \begin{array}{l} 1 : N_{ij} > T_2 \\ 0 : N_{ij} < T_2 \end{array}$$

Though the first embodiment employs only the normalized values $N_{ij}$, the present second embodiment achieves more efficient compression by binary encoding said values $N_{ij}$ into normalized codes $C_{ij}$.

Thus terminals 137, 138, 139, 140 of the unit 132 respectively release normalized codes $C_{11}$, $C_{12}$, $C_{21}$ and $C_{22}$. Also a terminal 135 releases the average $m_Y$ of the information Y in the block; a terminal 136 releases the upper five bits of the data $m_Y$; a terminal 133 releases the standard deviation $\sigma$ of the information Y in the block; and a terminal 134 releases the upper 4 bits of said value $\sigma_Y$.

The luminance edge information $\sigma_Y$ in the block, released from the arithmetic unit 112 is supplied to the decision unit 113, which generates the aboveexplaiend signal SEL for selecting the luminance information or the color information according to the luminance edge information $\sigma_Y$.

Figure 13:
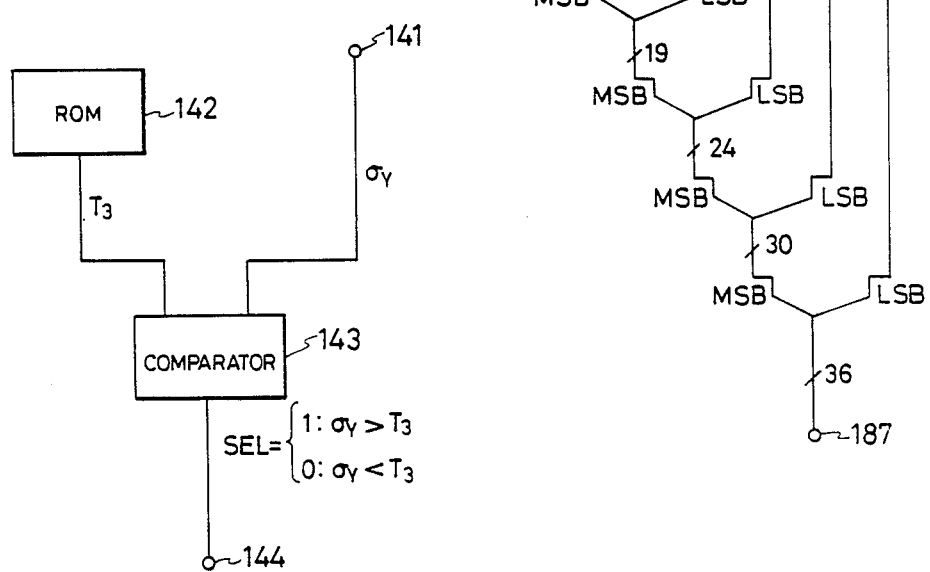
FIG. 13 is a block diagram showing the structure of a decision unit 113 in the second embodiment.

FIG. 13 shows the structure of the decision unit 113. In the present second embodiment, the standard deviation $\sigma_Y$ of the information Y is compared with the predetermined threshold value $T_3$, and the signal SEL is determined as follows:

$$SEL = \begin{array}{l} 1 : \sigma_Y > T_3 \\ 0 : \sigma_Y < T_3 \end{array}$$

In case of SEL=1, the encoding is conducted by adding the information $E_I$, $E_Q$ on color resolution, and reducing the number of bits of the luminance informaiton $m_Y$, $\sigma_Y$ and of the color rendition information $m_I$, $m_Q$.

On the other hand, in case of SEL = 0, the encoding is conducted by increasing the number of bits of the luminance information $m_Y$, $\sigma_Y$ and of the color rendition information $m_I$, $m_Q$. It is also possible to replace the comparator 143 with a subtractor and to utilize the sign bit of obtained difference as the selection signal SEL. Said selection signal is released from a terminal 144.

In this manner the arithmetic unit 112 releases the codes $\sigma_Y$, $m_Y$, $C_{ij}$ etc. encoded from the information Y.

(Characteristic extraction/encoding...information I, Q)

In the following there will be explained the encoding of color information.

The average units 114, 115 determine the average values of the information I, Q in the block. As said information are of 8 bits, said average value can be sufficiently represented by 8 bits. Therefore, the average units 114, 115 release average information $m_I$, $m_Q$ of 8 bits, and synthesizers 118, 119 to be explained later release the upper 6 bits of said information $m_I$, $m_Q$ (cf. FIG. 17A) or entire 8 bits thereof (cf. FIG. 17B) respectively when an edge is present in the block (SEL =1) or absent (SEL =0). As explained before, the circuit of said average unit 114 or 115 is equivalent to the brokenlined portion 145 in FIG. 12.

In the following there will be explained a process of encoding information on color resolution. The color resolution is disregarded in the first embodiment, but, in the second embodiment, is encoded as $E_I$, $E_Q$. For example if two different colors are present in the block (see FIG. 11B), a luminance edge is considered to be present in the block (SEL =1), and the pixels are divided by said edge into different groups (for example lighter pixels (represented by suffix l) and darker pixels (represented by suffix s)) as already explained in relation to FIGS. 11A and 11B. Then the differences, in the color information I, Q, of the averages ($m_{Il}$ and $m_{Is}$; $m_{Ql}$ and $m_{Qs}$) between the pixel groups are taken as $E_I$, $E_Q$ mentioned above. Thus the color arrangement $E_I$, $E_Q$ in the block depends on the normalized code $C_{ij}$ indicating the arrangement of luminance. The relationship between $C_{ij}$ and $E_I$, $E_Q$ will be explained later.

Figure 14:
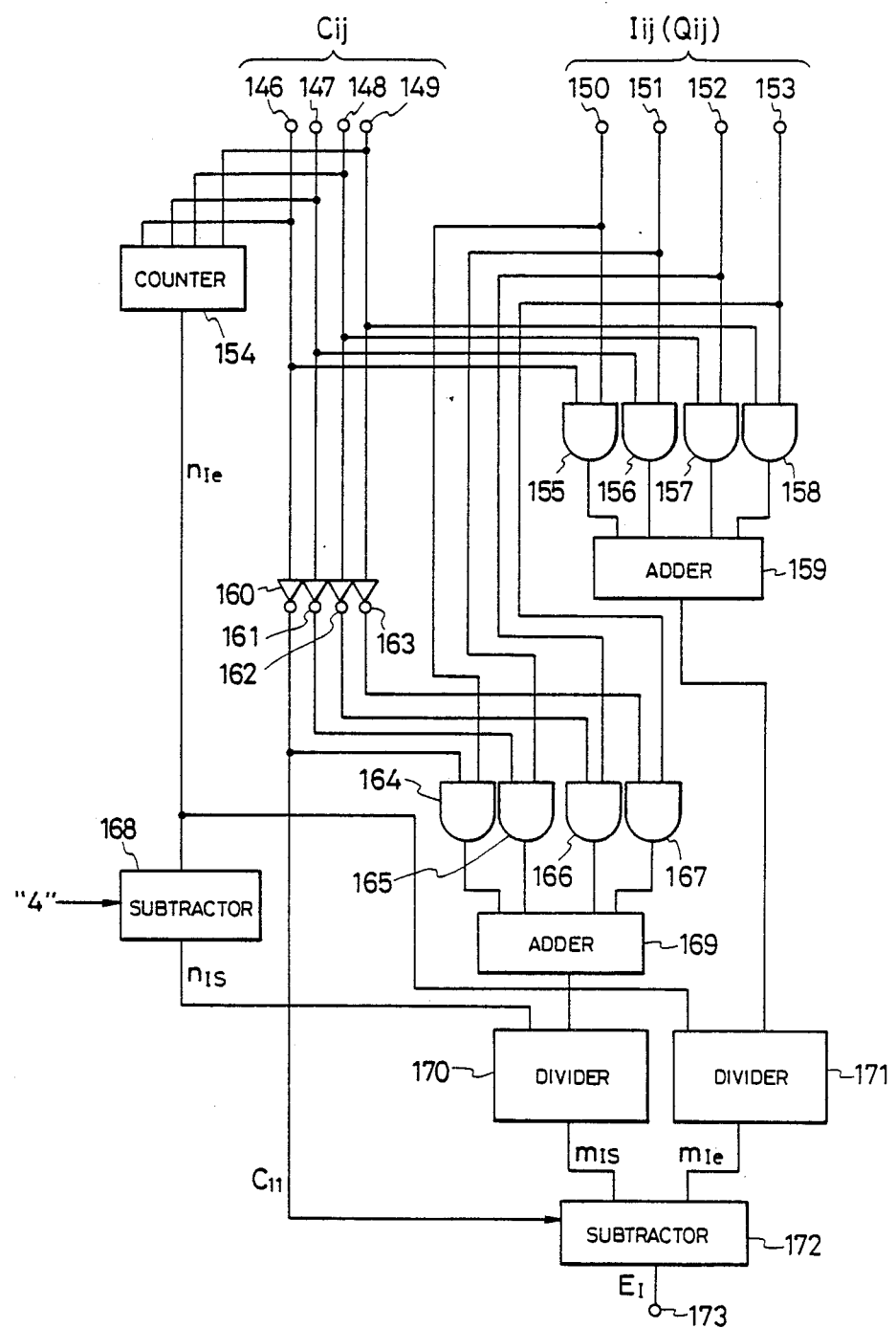
FIG. 14 is a block diagram showing the structure of an average difference unit 116 in the second embodiment.

FIG. 14 shows the structure of the average difference unit 116 or 117 for determining the resolution information $E_I$, $E_Q$, shown in FIG. 10. For the convenience of explanation FIG. 14 shows the average difference unit 116 for the information I, but the unit for the information Q has the same structure.

Terminals 146-149 receive the normalized codes $C_{11}$–$C_{22}$ from the arithmetic unit 112 (FIG. 12). Said code $C_{ij}$ has a capacity of 1 bit as encoded by the encoder 132 (FIG. 12), and indicates that the luminance information Y is large or small respectively at "1" or "0".

A counter 154 counts the number $n_{Il}$ of the pixels with large information Y, for which $C_{ij}$ is "1". On the other hand, a subtractor 168 calculates the number $n_{Is}$ of the pixels with small information Y, for which $C_{ij}$ is "0" (by a calculation $n_{Is} = 4 - n_{Il}$ since the total number of pixels in the block is four). These values $n_{Il}$, $n_{Is}$ are utilized for calculating the above-mentioned values $m_{Il}$, $m_{Is}$, $m_{Ql}$, $m_{Qs}$ by dividers 170, 171.

Gates 155-158 transmit $C_{ij}$ only when it is "1". Thus an adder 159 calculates the sum of $I_{ij}$ of the pixels with large luminance information $Y_{ij}$. The divider 171 releases an average obtained by dividing the output $\Sigma I_{ij}$ of the adder 159 with $n_{Il}$. Said average $m_{Il}$ from the divider 171 indicates the average color of light pixels for which $C_{ij}$ is "1".

Since $C_{ij}$ are inverted by inverters 160-163, an adder 169 determines the sum of $I_{ij}$ of the pixels with small luminance information $Y_{ij}$, and the output $m_{Is}$ of the divider 170 indicates the average color of the dark pixels for which $C_{ij}$ is "0".

The output of the subtractor 172 varies according to $C_{11}$. It releases, as $E_I$ from a terminal 173, a value $m_{Il} - m_{Is}$ or a value $m_{Is} - m_{Il}$ respectively in case $C_{11}$ = "1" indicating that the pixel X has large luminance information or in case $C_{11}$ = "0" indicating that the pixel $X_{11}$ has small luminance information.

(Synthesis)

The codes SEL, $\sigma_Y$, $m_Y$, $C_{11}$–$C_{22}$, $E_I$, $E_Q$, $m_I$, $m_Q$ obtained in the above-explained circuits are supplied to synthesizers 118, 119.

Figure 15:
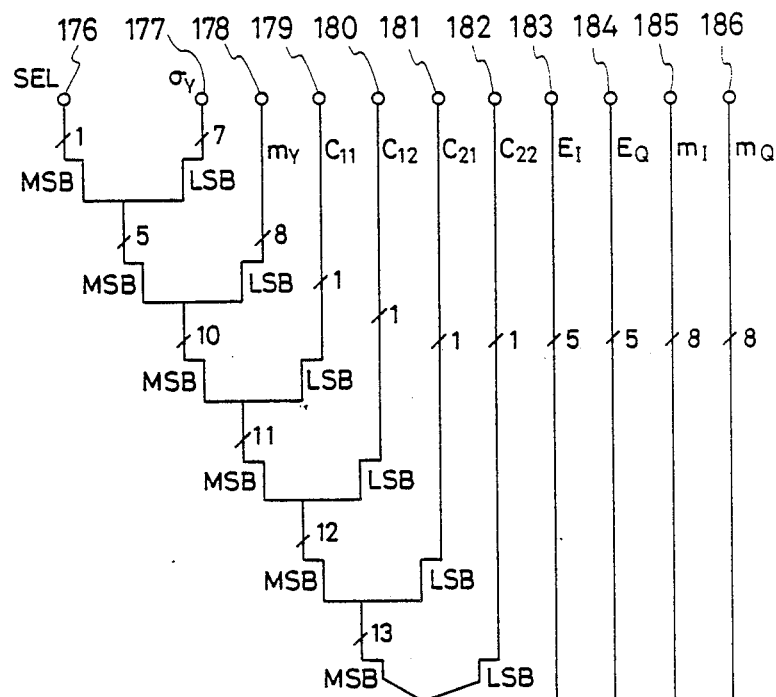
FIG. 15 is a block diagram showing the structure of a synthesizer 118 in the second embodiment.
Figure 17A:
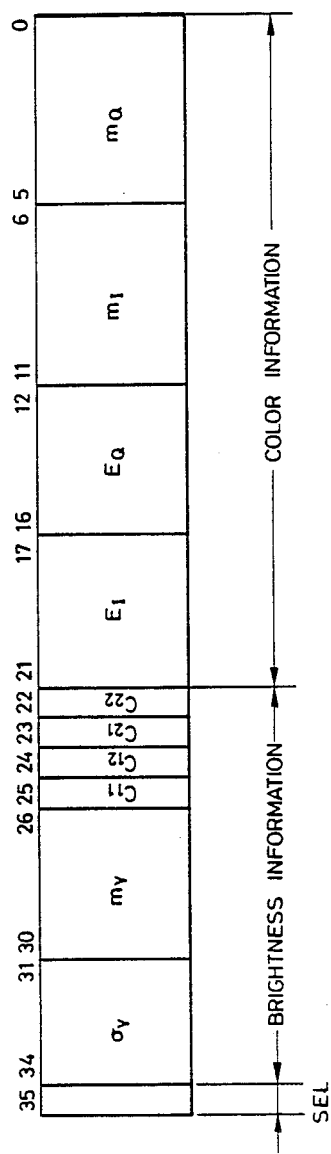
FIGS. 17A and 17B are charts showing the encoding formats in the second embodiment.

FIG. 15 indicates the structure of the synthesizer 118. Terminals starting from 176 respectively receive the selection signal SEL, standard deviation $\sigma_Y$ of information Y in the block, average $m_Y$, normalized codes $C_{11}$–$C_{22}$, resolution information $E_I$ of information I, resolution information $E_Q$ of information Q, average $m_I$ of information I in the block and average $m_Q$ of information Q in the block. These codes are combined in this order from the upper position and released from a terminal 187. Said synthesizer 118 is used for combining the codes in case of SEL =1, with a combined format shown in FIG. 17A. The numbers of bits of the codes SEL, $\sigma_Y$, $m_Y$, $C_{11}$–$C_{22}$, $E_I$, $E_Q$, $m_I$ and $m_Q$ supplied to the synthesizer 118 are respectively a, 7, 8, 1, 1, 1, 1, 5, 5, 8 and 8 as shown in FIG. 15. In the synthesizer 118, the lower bits of $m_Y$, $m_I$ and $m_Q$ are deleted by shifters as shown in FIG. 15 since emphasis is given not to tonal rendition but to resolution in case of SEL =1, and the bit structure shown in FIG. 17A is finally obtained.

Figure 16:
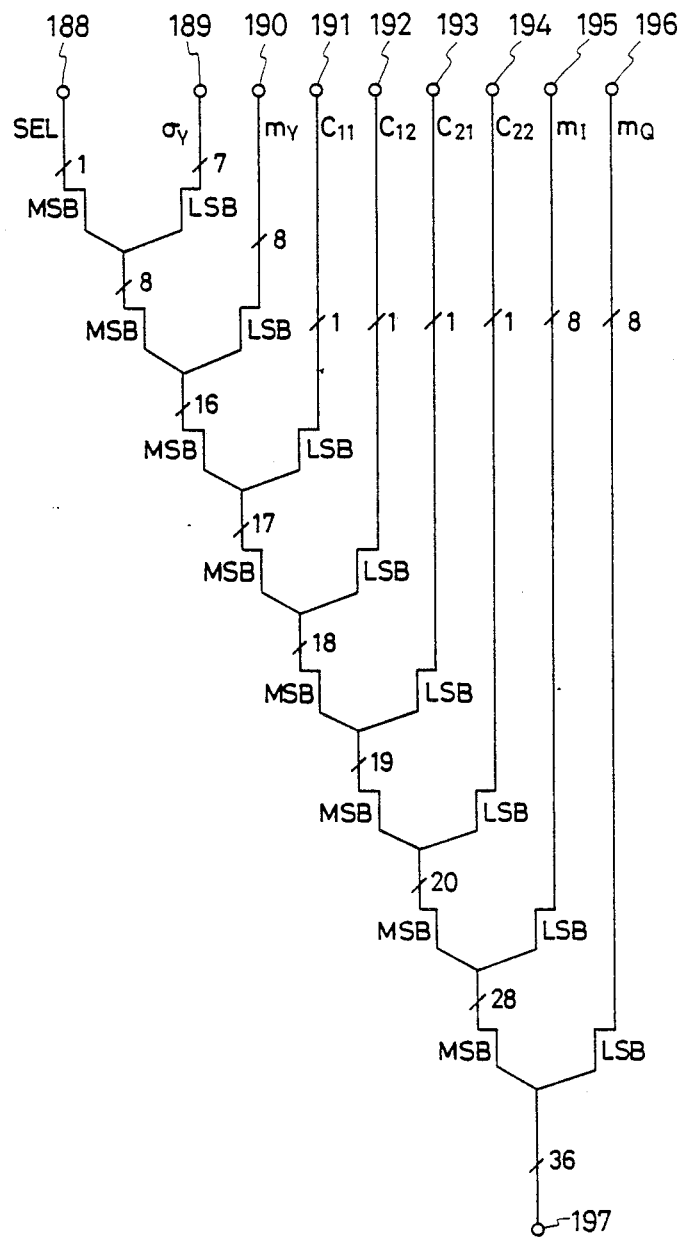
FIG. 16 is a block diagram showing the structure of a synthesizer 119 in the second embodiment.

FIG. 16 shows the structure of the synthesizer 119. Terminals starting from 188 respectively receive the selection signal SEL, standard deviation $\sigma_Y$ of information Y in the block, average $m_Y$, normalized codes $C_{11}$–$C_{22}$, average $m_I$ of information I in the block and average $m_Q$ of information Q in the block, and said codes are combined from the upper position as in the synthesizer 118 and released from a terminal 197.

A selector 120 selects either of the outputs of the synthesizers 118, 119 according to the selection signal SEL. When the selection signal SEL is "1", indicating the presence of a large change in luminance in the block, there is selected the output of the synthesizer 118, which, as shown in FIG. 17A, contains the color resolution information $E_I$, $E_Q$ and in which the amount of rendition information is reduced. On the other hand, when the selection signal SEL ="0", indicating the absence of such large change in luminance, there is selected the output of the synthesizer 119 which does not contain the color resolution information and in which the amount of rendition information is increased in comparison with the output mentioned above.

Each of the R, G, B information in the original signal has 8 bits per pixel, and each of the Y, I, Q information also has 8 bits per pixel, so that the amount of information in the block is 96 bits prior to encoding. In the format shown in FIG. 17A, the selection signal SEL is 1 bit; standard deviation $\sigma_Y$ of information Y in the block is 4 bits (16 levels); average $m_Y$ of information Y in the block is 5 bits (32 levels); each normalized code of information Y is 1 bit; difference $E_I$ in averages of two colors of information I in the block is 5 bits (32 levels); difference $E_Q$ in averages of the information Q is 5 bits (32 levels); average $m_I$ of color of information I containing the infromation of $X_{11}$ is 6 bits (64 levels); and average $m_Q$ of color of information Q containing the information of $X_{11}$ is 6 bits (64 levels).

Figure 17B:
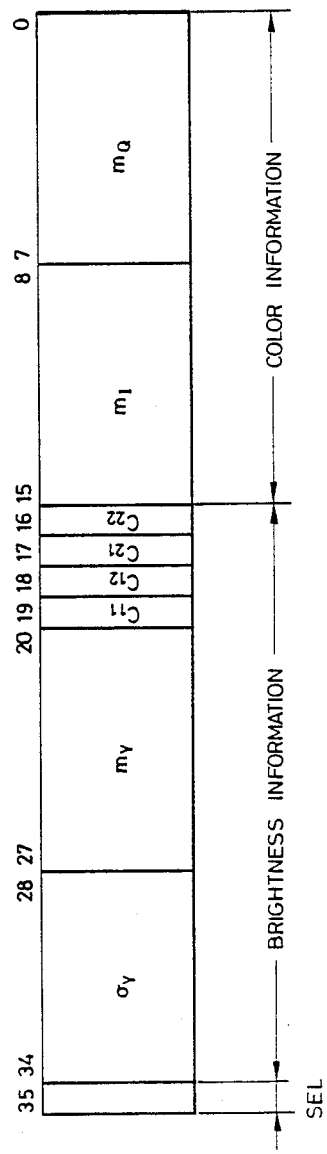

On the other hand, in the format shown in FIG. 17B, the selection SEL is 1 bit; standard deviation $\sigma_Y$ of information Y in the block is 7 bits (128 levels); average $m_Y$ of information Y in the block is 8 bits (256 levels); each normalized code of information Y is 1 bit; average $m_I$ of information I in the block is 8 bits (256 levels) and average $m_Q$ of information Q in the block is 8 bits (256 levels.).

(Decoding)

In the following there will be explained the decoding process in the second embodiment. At first the uppermost bit (SEL) is extracted, and a bit arrangement shown in FIG. 17A or FIG. 17B is identified respectively if said SEL bit is "1" or "0". Then the codes $\sigma_Y$, $m_Y$, $C_{11}$, $C_{12}$, $C_{21}$ and $C_{22}$ are extracted to reproduce the Y-information $Y_{ij}'$ of each pixel according to the following equation:

$$Y'_{ij}=C_{ij}\times\sigma_Y+m_Y.$$

Then the color information is extracted. When SEL is "1" indicating the presence of a color edge in the block, the codes $E_I$, $E_Q$, $m_I$ and $m_Q$ are extracted to reproduce $I'_{ij}$, $Q'_{ij}$ as follows:

$$I'_{ij}=C_{ij}\times E_I+m_I$$

$$Q'_{ij}=C_{ij}\times E_Q+m_Q.$$

The reproduced signals Y', I', Q' are subjected to an inverse conversion of the conversion unit 108 shown in FIG. 10 to obtain the signals R', G', B'.

(Variation of second embodiment)

In the second embodiment the edge information is composed of the standard deviation of information Y in the block, but it is also possible to simplify the circuit structure by employing the difference between the maximum and minimum values in the block.

Also in said second embodiment the signals $E_I$, $E_Q$ are subjected to a simple change in the number of levels, but it is also possible to conduct vector digitization on these signals according to the color combinations present in the nature.

Also the form of signals to be encoded is not limited to the Y-I-Q color television signals employed in the second embodiment but can naturally be other information forms in which the luminance information and color information are separated, for example the (L*, a*, b*) space defined by CIE 1976.

The size of pixel block can naturally be larger than 2×2 pixels.

Furthermore, if two colors are present in a block, the signals I', Q' may be reproduced as indicated by following equations, instead of selecting the output according to the value of $C_{11}$:

$$I'_{ij}=C_{ij}\times E_I\times(-1)^{C_{11}}+m_I$$

$$Q'_{ij}=C_{ij}\times E_Q\times(-1)^{C_{11}}+m_Q$$

(Effect of second embodiment)

As explained in the foregoing, in case of dividing a color image into blocks each composed plural pixels, separating the luminance information and the color information in each block and conducting an encoding with a fixed length for each block, it is rendered possible to prevent deterioration of image quality such as by color blotting and to achieve highly efficient encoding of color image signal matching the human visual characteristics, by generating edge information from the luminance information and varying the code length in respective encoding of the luminance information and the color information according to said edge information.

Also the encoding with a fixed length in each block has an advantage that the position of each pixel in the image can be maintained constant in the storage of data in an image memory. Consequently the required capacity of image memory can be determined only by the size of the image size. Also in an image processing for such color image, the information of surrounding pixels can be easily obtained, and such image processing can be conducted with a high speed since the processing can be executed in the unit of block.

Third embodiment

Figure 18:
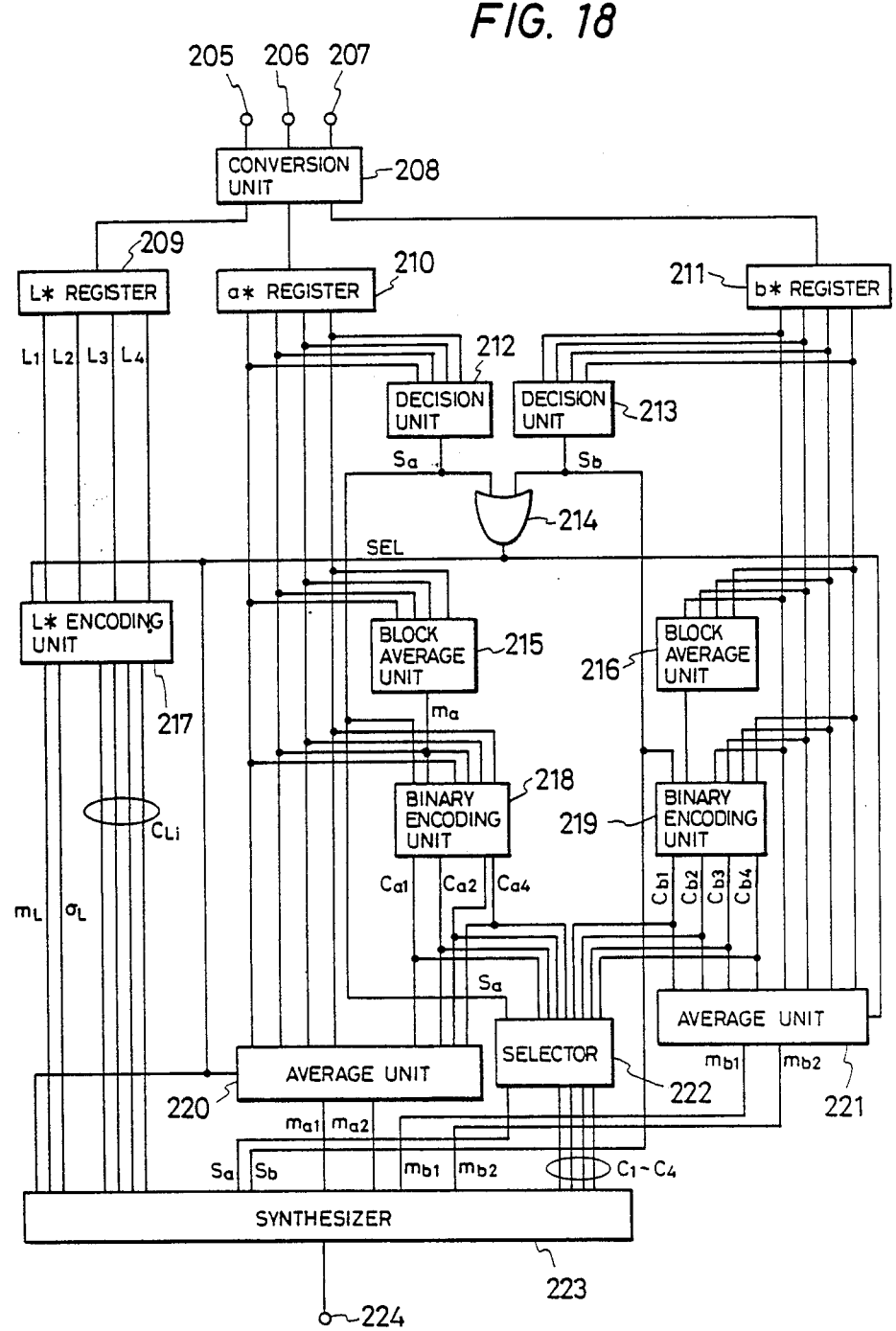
FIG. 18 is a block diagram showing the entire structure of a third embodiment.

In the following there will be explaiend a third embodiment, with reference to FIG. 18 and ensuing drawings.

(Outline of third embodiment)

Figure 19:
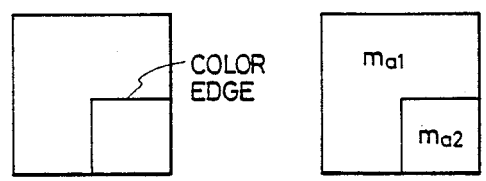
FIG. 19 is a view showing division of a block by an edge in the third embodiment.

In the following the third embodiment will be outlined in comparison with the first and second embodiments:

1) Resolution information:

The first embodiment detects the resolution information as an edge in luminance, and encodes said edge information. The second embodiment additionally detects a color edge, and encodes the luminance edge and the color edge. In the present third embodiment, the color edge is detected from the color information itself. More specifically the color edge is detected in each of two colors, and there are obtained average color information $m_{a1}$ (or $m_{b1}$) and $m_{a2}$ (or $m_{b2}$) for two areas divided by the color edge as shown in FIG. 19. In the absence of the color edge, the code is obtained by digitizing the average $m_a$ or $m_b$ of the entire block;

2) Edge detection:

In the first and second embodiments, the edge is detected from the standard deviation $\sigma_Y$ in the block, but, in the third embodiment, the edge is detected from the difference between the maximum and minimum values of the color information:

3) Color representation system:

The first and second embodiments employ YIQ system, but the third embodiment employs parameters $L^*$, $a^*$ and $b^*$ in the CIE 1976 ($L^*$, $a^*$, $b^*$) space proposed as a uniform sensation space in the CIE conversion in 1975, wherein $L^*$ represents the luminocity and $a^*$ and $b^*$ represent the color sensations;

4) Pixel block:

There is employed a block of 4 pixels shown in FIG. 3. For the purpose of simplifying the explanation, the signals relating to the pixels $X_{11}$, $X_{12}$, $X_{21}$ and $X_{22}$ are respectively represented by suffixes 1, 2, 3 and 4.

In the following there will be explained the third embodiment in detail, with reference to FIG. 18 and ensuing drawings.

A conversion unit 208 receives the R-information through a terminal 205 in the order of $R_1$, $R_2$, $R_3$ and $R_4$; G-information through a terminal 206 in the order of $G_1$, $G_2$, $G_3$ and $G_4$; and B-information through a terminal 207 in the order of $B_1$, $B_2$, $B_3$ and $B_4$, and separates the luminance information $L^*$ and color information $a^*$, $b^*$ for each pixel, based on thus entered information. Serial-to-parallel registers 209, 210, 211 temporarily store the values of $L^*$, $a^*$, $b^*$ in the unit of blocks.

(Encoding of luminance $L^*$)

Figure 20:
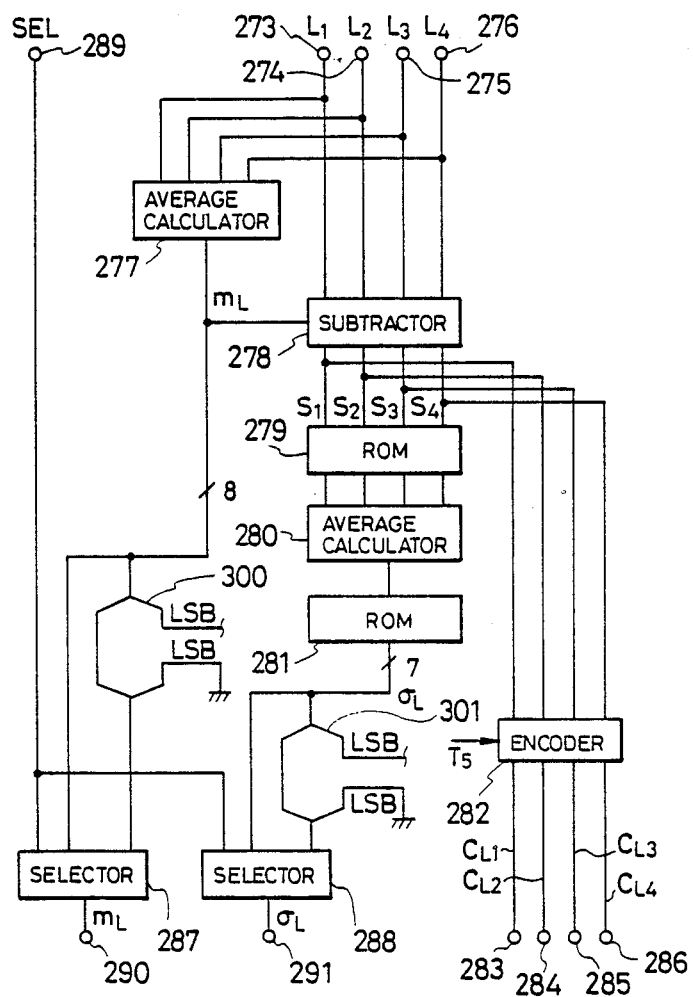
FIG. 20 is a block diagram showing the structure of an L* encoding unit 217 in the third embodiment.

Now reference is made to FIG. 20 for explaining an $L^*$ encoder 217 for encoding the luminance information $L^*$. In FIG. 20, 277–282 are same as 126–132 in the first embodiment shown in FIG. 20 and will therefore be explained in simple manner. An average unit 277 generates the average $m_L$ of the information $L^*$ in the block. A ROM 281 generates the standard deviation $\sigma_L$ representing the luminance edge information. Also an encoder 282 generates the normalized codes $C_{L1}$–$C_{L4}$ in the same manner as the encoder 132 shown in FIG. 12.

The output of the average unit 277 is an average $m_L$ of $L^*$ information of four pixels and has a capacity of 8 bits. A shifter 300 receives said average $m_L$ of 8 bits, then reduces it to 5 bits by a shift of 3 bits, then add two "0" bits to the lower position and supplies it to an input of a selector 287, of which the other input terminal receives the average $m_L$. The selector 287 selects either of these two input signals according to a selection signal SEL which is supplied from the OR circuit 214 (FIG. 18) through a terminal 289 and is a logic sum of an $a^*$ edge signal ($S_a$ to be explained later) and a $b^*$ edge signal ($S_b$) Thus:

$$SEL = S_a + S_b$$

Output of selector 287 = 5-bit mL (SEL =1; color edge present) or 8-bit mL (SEL =0; color edge absent).

Similarly the standard deviation $\sigma_L$ in the block, released from a ROM 281, has a capacity of 7-bits. A shifter 301 reduces it to 4 bits, and attaches three "0" bits in the lower position. Thus:

Output of selector 288 = 4-bit $\sigma_L$ (SEL =1; color edge present) or 7-bit $\sigma_L$ (SEL =1; color edge absent). Said signal $\sigma_L$ is released from a terminal 291.

(Edge detection)

Figure 21:
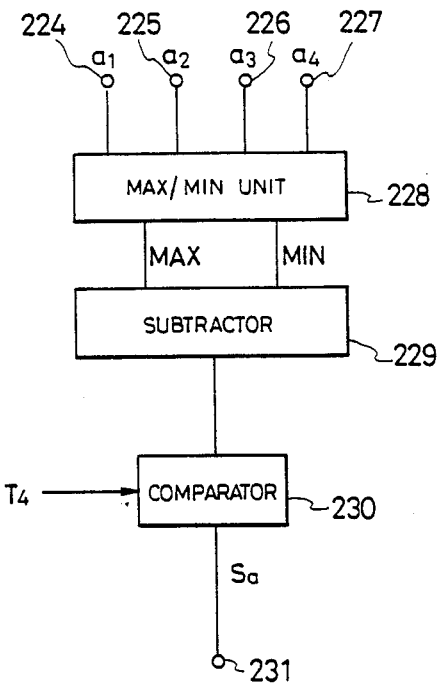
FIG. 21 is a block diagram showing the structure of a decision unit 212 in the third embodiment.

FIG. 21 shows the structure of a decision unit 212 or 213. As they are mutually equivalent, the unit 212 will be explained in the following.

The decision unit 212 discriminates the presence or absence of a color edge in the block, from the information $a^*$ in the block, and releases the result as an edge signal $S_a$ on the information $a^*$. For discriminating the color edge, the decision unit 212 utilizes a difference between maximum and minimum values:

$$E_a = Max(a_1, a_2, a_3, a_4) - Min(a_1, a_2, a_3, a_4)$$

on the $a^*$-axis on a color plane ($a^*$, $b^*$). Said discriminating value $E_a$ is taken as the color edge information. A max/min unit 228 releases the maximum value Max($a_1$, $a_2$, $a_3$, $a_4$) and the minimum value Min($a_1$, $a_2$, $a_3$, $a_4$), and a subtractor 229 releases the edge information $E_a$. A comparator 230 conducts comparison with a predetermined threshold value $T_4$, and generates a color edge signal $S_a$ according to:

$S_a = 0$ ($T_4 > E_a$); color edge on $a^*$ absent $S_a = 1$ ($T_4 \leq E_a$); color edge on $a^*$ present.

Similarly the decision unit 213 generates a color edge signal $S_b$ based on the information $b^*$ in the block and according to:

$E_b = Max(b_1, b_2, b_3, b_4) - Min(b_1, b_2, b_3, b_4)$ $S_b = 0$ ($T_5 > E_b$); color edge on $b^*$ absent $S_b = 1$ ($T_5 \leq E_b$); color edge on $b^*$ present.

SEL is equal to $S_a + S_b$ as explained above. SEL becomes equal to "1" when either one of $S_a$ and $S_b$ is "1", but it is to be noted that, even in such case, the other of $S_a$ and $S_b$ may be "0". This fact is related to the color encoding in the third embodiment to be explained later (cf. FIG. 25).

(Information on color tonal rendition)

Block average units 215, 216 determine respectively averages $m_a$, $m_b$ of the information $a^*$, $b^*$ in the block as follows:

$m_a = (a_1 + a_2 + a_3 + a_4)/4$ $m_b = (b_1 + b_2 + b_3 + b_4)/4$.

(Detection of color edge distribution)

Figure 22:
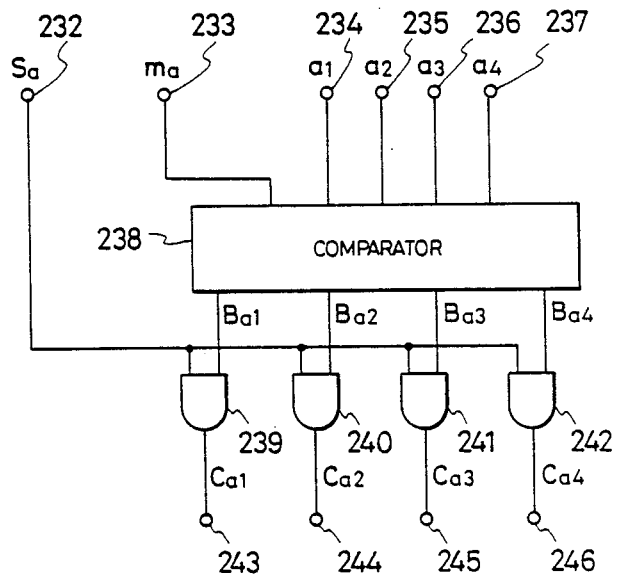
FIG. 22 is a block diagram showing the structure of a binary encoding unit 218 of the third embodiment.

FIG. 22 shows the structure of a binary encoding unit 218 or 219. As they are mutually equivalent, there will be explained, in the following, the binary encoding unit 218 for binary encoding of the information a*. When a color edge is present in the block and divides said block into two areas, the binary encoding unit represents the distribution of said two areas by binary codes $C_{a1}$-$C_{a4}$. For example $C_{a1}$="1" indicates that the color a* of the pixel $X_1$ belongs, in the block, to an area with a larger color value.

Referring to FIG. 22, a comparator 230 compares each of $a_1$-$a_4$ with the average $m_a$ in the block and generates the results $B_{a1}$-$B_{a4}$ of comparison as follows:

$$B_{ai} = 1; (a_i > m_a)$$
$$0; (a_1 < m_a) \quad (i = 1 - 4)$$

Said signals $B_{a1}$-$B_{a4}$ are respectively supplied to 2-input AND gates 239-242, of which the other inputs receive the a*-edge signal $S_a$, and which determine logic products of $B_{ai}$ and $S_a$. More specifically, the AND $B_{a1}$-$B_{a4}$ of the pixels as the binary information $C_{a1}$-$C_{a4}$ of the information a* when $S_a=1$, indicating the presence of a color edge in the block. On the other hand, in case of $S_a=0$, indicating the absence of a color edge in the block, said gates release "0" as $C_{a1}$-$C_{a4}$. These values $C_{a1}$-$C_{a4}$ are used for calculating average colors in two areas divided by the color edge.

(Extraction of color information in area)

Figure 23:
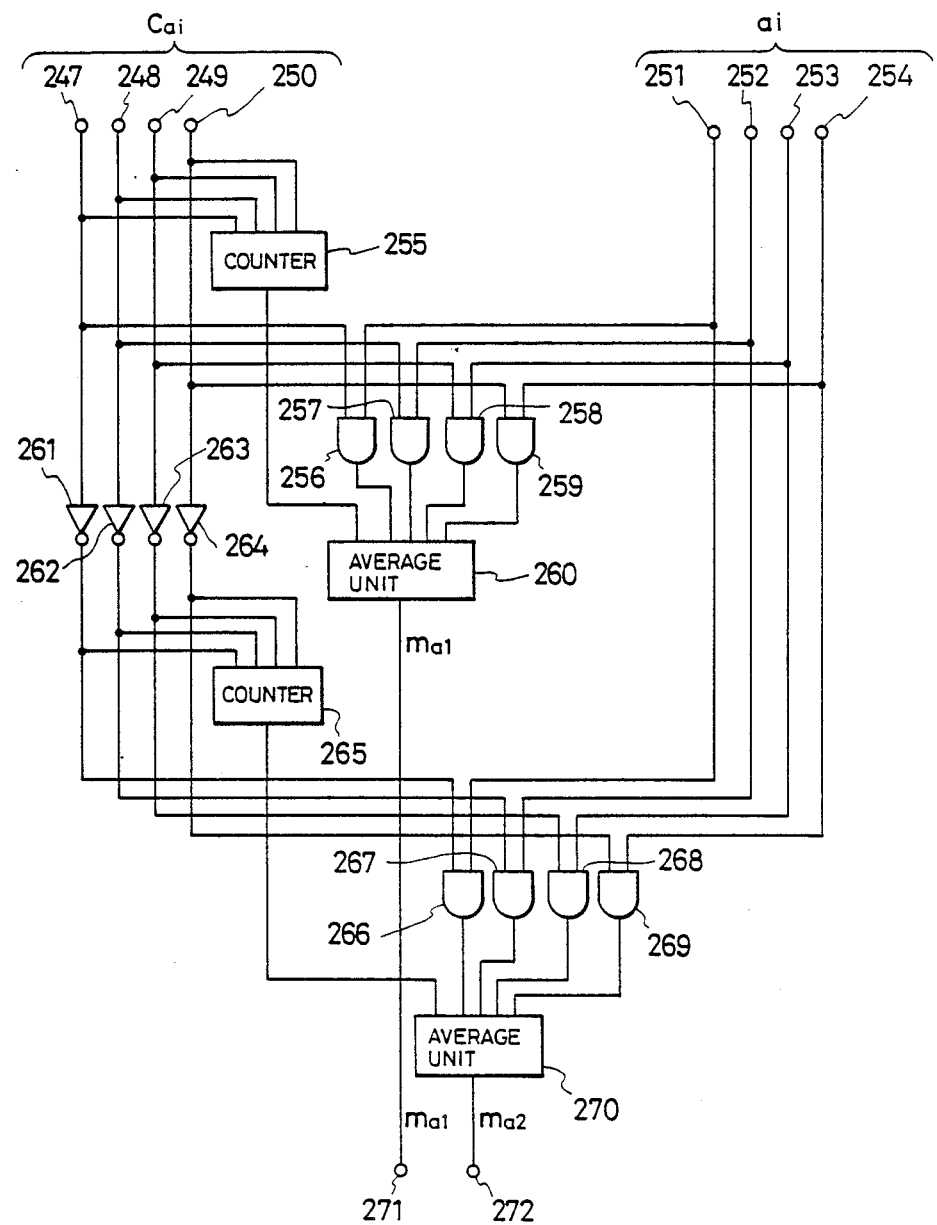
FIG. 23 is a block diagram showing the structure of an average unit 220 in the third embodiment.

FIG. 23 shows the structure of an average unit 220 or 221. As they are mutually equivalent, the unit 220 will be explained in the following. The unit 220 receives the above-mentioned binary encoded information $C_{a1}$-$C_{a4}$ and a*=information $a_1$-$a_4$ of the pixels. A counter 255 counts the number of "1" in $C_{a1}$-$C_{a4}$, and a counter 265 counts the number of "0" in $C_{a1}$-$C_{a4}$.

The counter 255, AND gates 256-259 and an average unit 260 select the pixels having a*-information larger than the average ma when the block contains a color edge ($S_a=1$), and determine the average $m_{a1}$ of said pixels, corresponding to an area $m_{al}$ shown in FIG. 19B. When the block does not contain a color edge, $C_{a1}$ are "0" so that the average $m_{al}$ is "0". The average $m_{al}$ has a capacity of 8 bits. On the other hand, the counter 265, AND gates 266-269 and average unit 270 generate an average $m_{a2}$ of the a*-information of the pixels for which the a*-information is smaller than $m_a$.

Thus the average unit 220 releases $m_{al}$ (8 bits) and $m_{a2}$ (8 bits). If the block does not contain a color edge, the average $m_{a1}$ becomes "0", and the average $m_{a2}$ becomes equal to the average $m_a$ of a*information in the entire block.

Also the average unit 221 releases $m_{b1}$ and $m_{b2}$, and, if the block does not contain a color edge, the average $m_{bl}$ becomes "0" and the average $m_{b2}$ becomes equal to the average $m_b$ of b*-information in the entire block.

Now there will be explained a selector 222, which selects the outputs $C_{a1}$-$C_{a4}$, $C_{b1}$-$C_{b4}$ of the binary encoding units 218, 219 according to the combination of edge signals $S_a$, $S_b$ to generate outputs $C_1$-$C_4$ in the following manner:

When $S_a=S_b=0$; $C_1 \sim C_4 = C_{b1} \sim C_{b4}$ (however $C_{b1} \sim C_{b4}$ are all "0" based on the above-explained result ) of binary encoding:

When $S_a=0$, $S_b=1$; $C_1 \sim C_4 = C_{b1} \sim C_{b2}$;
When $S_a=1$, $S_b=0$; $C_1 \sim C_4 = C_{a1} \sim C_{a4}$;
When $S_a=S_b=1$; $C_1 \sim C_4 = C_{a1} \sim C_{a4}$ (as the two-color distributions of a*, b* in the block are not much different mutually, the distribution of b* can be considered to follow that of a*)

From the foregoing, the selector 222 can select $C_1$-$C_4$ from $C_{b1}$-$C_{b4}$ or $C_{a1}$-$C_{a4}$ solely based on the value of $S_a$ (cf. FIG. 25).

(Synthesizing)

The above-explained codes SEL, $m_L$, $\sigma_L$, $C_{L1}$-$C_{L4}$, $S_a$, $S_b$, $m_{a1}$, $m_{a2}$, $m_{b1}$, $m_{b2}$ and $C_1$-$C_4$ are supplied to a synthesizer 223.

The output of the selector 287 (FIG. 20) is:

5-bit $m_L$(SEL =1; color edge present) or 8-bit $m_L$(SEL =0; color edge absent)

as explaiend before. Similarly the output of the selector 288 is:

4-bit $\sigma_L$: (SEL =1; color edge present) or 7-bit $\sigma_L$: (SEL =0: color edge absent).

At first the synthesizer 223 executes synthesis with bit shifting, by selecting the bit length for mL and $\sigma_L$ according to the value of SEL (cf. FIG. 24). The codes $C_{L1}$-$C_{L4}$ are released from the synthesizer 223 without change.

The data $m_{al}$, $m_{a2}$, $m_{b1}$ and $m_{b2}$ are synthesized as shown in FIG. 25 according to the values of $S_a$, $S_b$. Each of these data is originally 8- bits, but if an edge is present in the a*-information ($S_a=1$), the upper four bits of $m_{a1}$ and those of $m_{a2}$ are released. Also if b* does not have an edge ($S_b=0$), $m_{b2}$ (8bits) is released as $m_b$.

In this manner the color information and the luminance information are encoded with variable amount of information, depending on the presence or absence of color edge. As will be apparent from FIGS. 24A and 24B, the proportions of luminance information and color information in the code vary according to the presence or absence of color edge in the block.

(Decoding)

Figure 24A:
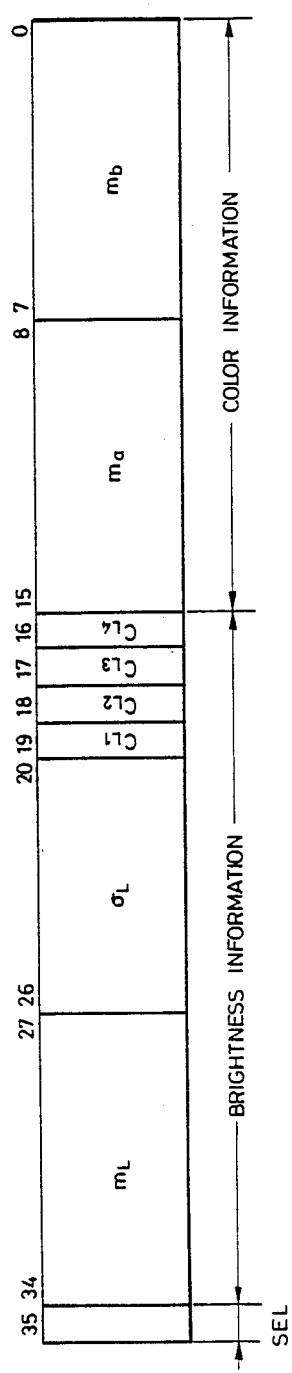
FIG. 24A and 24B are charts showing the encoding formats in the third embodiment.
Figure 24B:
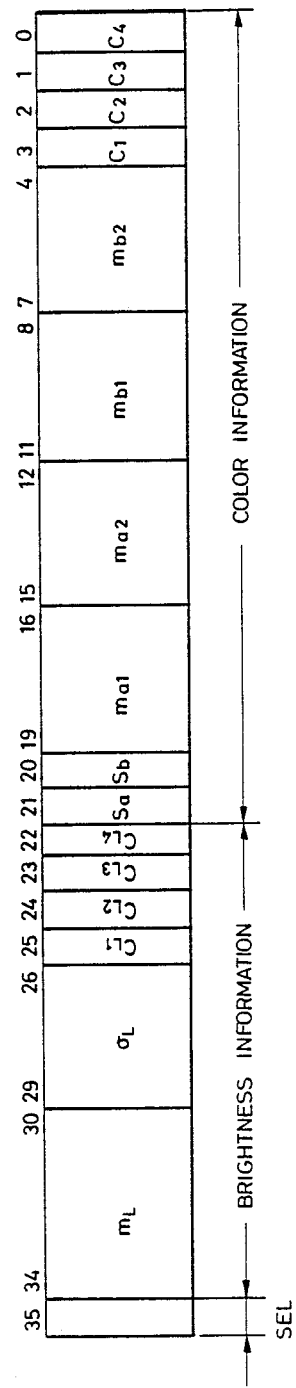

Finally the decoding in the third embodiment will be briefly explained. Upon reception of a code as shown in FIG. 24A or 24B, the code SEL in the uppermost bit is checked.

If SEL ="0", the code is decoded under a condition that the block does not contain a color edge. The decoded pixel information $L_1'$, $L_2'$, $L_3'$ and $L_4'$ corresponding to the L* information are represented by:

$$L_i' = m_L + \sigma_L \times C_{Li}$$

Also a*' and b*' after decoding are represented by:

$$a^{*'} = m_a$$

$$b^{*'} = m_b$$

The decoded pixel information L*', a*', b*' are subjected to a conversion inverse to that conducted by the converter 208 in the encoding, thereby obtaining decoded information R', G' and B'.

If SEL ="1", the decoding is conducted under a condition that the block contains a color edge. As in the case of SEL =0, $L_1'$-$L_4'$ can be represented as:

$$L_i' = m_L + \sigma_L \times C_{Li}.$$

The information $a^*$, $b^*$ are determined according to the examples shown in FIG. 25, depending on the combination of bits $S_a$ and $S_b$ in the code shown in FIG. 24. More specifically:

When $S_a=0$, $S_b=1$;

$$a_i' = m_a$$

$$b_i' = m_{bi} \times C_i + m_{b2} \times C_i$$

When $S_a=1$, $S_b=0$;

$$a_i' = m_{ai} \times C_i + m_{a2} \times C_i$$

$$b_i' = m_b$$

When $S_a=1$, $S_b=1$;

$$a_i' = m_{a1} \times C_i + m_{a2} \times C_i$$

$$b_i' = m_{b1} \times C_i + m_{b2} \times C_i$$

The information $L^*$, $a^*$, $b^*$ thus decoded are subjected to an inverse conversion as in the case of SEL =0 to obtain decoded information R', G', B'

(Extension of third embodiment)

The third embodiment encodes the luminance information by the average in the block, standard deviation and binary codes, but it is naturally possible to replace the standard deviation for example with the minimum difference between the pixels. Also the luminance information may be encoded by other encoding processes, such as vector digitization.

The luminance and color information in the third embodiment are composed of Y, I, Q information, but there may naturally be employed other information systems in which the luminance information and color information are separated, such as the (L*, a*, b*) space defined by CIE 1976, or the (Y, I, Q) space ordinarily employed in television.

The size of pixel block, which is 2×2 pixel in the third embodiment, may naturally be larger. Also the component blocks and circuitly of the third embodiment may be partially replaced by ROM's.

The number of plural colors is assumed as two in the third embodiment, but it will become three or four as the block becomes larger. In such case there may be employed multi-value distribution information of a number corresponding to the number of colors present in the block, and there may be increased the color information for such plural colors.

In the third embodiment, the color distribution information is encoded separately from the luminance resolution information, but, as in the second embodiment, the color distribution information may be replaced by the luminance resolution.

Also the comparison with the threshold value for identifying the persence or absence of color edge is conducted independently for $a^*$ and $b^*$, but such comparison may also be conducted on united information of $a^*$ and $b^*$, for example on a value $\{(a_{max}-a_{min})+(b_{max}-b_{min})\}$ or $\{(a_{max}-a_{min})^2+(b_{max}-b_{min})^2\}^{\frac{1}{2}}$, wherein $a_{max}$, $a_{min}$ are maximum and minimum values of $a^*$ in the block, and $b_{max}$, $b_{min}$ are maximum and minimum values of $b^*$ in the block.

(Effect of third embodiment)

As explained in the foregoing, in dividing a color image into blocks each composed of plural pixels, separating the luminance information and the color information in each block and conducting an encoding with a fixed code length for each block, it is rendered possible to prevent deterioration of image quality such as by color blotting and to achieve highly efficient encoding of color image signal matching the human visual characteristics, by extracting edge information from color information, then selecting the code length in the encoding of the luminance information and the color information according to said edge information, and eventually including information on resolution in the color information.

Also the encoding with a fixed code length in each block has an advantage that the position of each pixel in the image can be maintained constant in the storage of data in an image memory. Consequently the required capacity of image memory can be determined only by the size of the image size. Also in an image processing for such color image, the information of surrounding pixels can be easily obtained, and such image processing can be conducted with a high speed since the processing can be executed in the unit of blocks.

SUMMARY

The encoding apparatus disclosed in the first to third embodiments can be summarized as follows:

A-1) The first to third embodiments commonly disclose a structure of generating a code of fixed length indicating the presence of an edge in the block, and encoding the luminance information and the color information respectively into codes of predetermined bit lengths which are varied according to the presence or absence of the edge.

Said structure encodes the luminance information (Y or L*) and the color information (IQ or a*b*) with a shorter bit length (with less digitizing levels) as shown in FIGS. 9A, 17A, 24A or in FIGS. 9B, 17B, 24B, according to the extent of said edge. In this manner it is rendered possible to improve the compression efficiency and to obtain a compressed image matching the human visual characteristics.

The code of a fixed length indicating the edge detection is $\sigma_Y$ of fixed length in the first embodiment, or the SEL in the second and third embodiment. The code SEL is needed in the second and third embodiments since $\sigma_Y$ is encoded in two different lengths according to the presence or absence of edge.

If the entire length of codes corresponding to the color image data of a block is maintained constant (43 bits in the first embodiment, or 36 bits in the second and third embodiments), there is obtained an advantage, as explaiend before, of maintaining the positional relationship of the pixels in the image, in case of storage in an image memory.

A-2) The edge detection is achieved by detecting a luminance edge from luminance informaiton (first embodiment), or detecting a luminance edge from color information (second embodiment), or detecting a color edge from color information (third embodiment).

A-3) The luminance portion of the obtained codes is obtained by encoding the standard deviation ($\sigma_Y$), average luminance ($m_Y$) and luminance inclination in the block ($B_{ij}$ or $C_{ij}$) into a predetermined code length.

The color portion is obtained by encoding the color agerage values ($m_I$, $m_Q$, $m_a$, $m_b$) and the color inclination ($E_I$, $E_Q$, $m_{a1}$, $m_{a2}$, $m_{b1}$, $m_{b2}$) into a predetermined code length.

B-1) The second and third embodiments disclose a structure of generating a code of a fixed length indicating the edge detection in the block, and encoding the luminance information (Y, L*), color average ($m_I$, $m_Q$, $m_a$, $m_b$) and color inclination ($E_I$, $E_Q$, $m_{a1}$, $m_{a2}$, $m_{b1}$, $m_{b2}$) into codes of predetermined lengths which are variable according to the presence or absence of detected edge.

The above-mentioned structure allows to maintain the information on edges with efficinet compression, and the decoded image matches the human visual characteristics.

C-1) The first to third embodiments disclose a structure of generating a code of a fixed length indicating the detection of an edge in the block, and encoding the information indicating distribution of color image data in the block and the average of color image data in each area of distribution, into codes of predetermined lengths which are variable according to the presence or absence of edge.

Said structure allows to maintain the edge information with efficient compression, and the decoded image matches the human visual characteristics.

C-2) The second embodiment detects the luminance edge $\sigma_Y$ from the luminance information Y, then calculates the luminance average $m_Y$ in the block, detects the luminance distribution $C_{ij}$ in the block from the difference between $m_Y$ and luminance of each pixel, and calculates averages $m_{Is}$, $m_{Il}$, $m_{Qs}$, $m_{Ql}$ of the color information in each area, corresponding to said luminance distribution.

C-3) The third embodiment calculates the averages $m_a$, $m_b$ of color information in the block, then detects the color distribution $C_{a1}$–$C_{a4}$, $C_{b1}$–$C_{b4}$ in the block from the difference of said averages and the color information of pixels, and determines the averages $m_{a1}$, $m_{a2}$, $m_{b1}$, $m_{b2}$ of color information in each area corresponding to said color distribution.

As explained in the foregoing, the luminance information and the color information are encoded with a shorter bit length (with less digitizing levels) according to the extent of the edge. In this manner it is rendered possible to improve the compression efficiency and to obtain a compressed image matching the human visual characteristics.

What is claimed is:

1. A color image data encoding apparatus for encoding color image data, consisting of luminance data and color data, by the unit of a block of a predetermined size, comprising:
   means for discriminating a presence/absence of an edge in said block using said luminance data; and
   encoding means for encoding said color image data into a code of a predetermined bit length for each block,
   wherein said code has a first part related to said luminance data and a second part related to said color data, and a ratio of lengths of the first and second parts is variable in accordance with a discrimination result of said discriminating means.

2. A color image data encoding apparatus according to claim 1, wherein said encoding means is adapted to encode said luminance data with a longer bit length in response to the discrimination of the presence of an edge than in case of the discrimination of the absence of an edge.

3. A color image data encoding apparatus according to claim 1, wherein said encoding means comprises:
   arithmetic means for calculating color average in color and inclination in color from the color data; and
   quantizing means for quantizing these two values, respectively.

4. A color image data encoding apparatus for encoding color image data, consisting of luminance information and color information, by the unit of a block of a predetermined size, comprising:
   edge detection means for detecting an edge in luminosity of the color image data in said block, based on said color information;
   generating means for generating a code of a fixed length indicating the detection of said edge in said block;
   encoding means for encoding said luminance information and said color information into codes of predetermined bit lengths which are variable in accordance with the presence or absence of said edge, respectively; and
   forming means for forming a code from the above-mentioned code of fixed length and the codes of predetermined bit lengths.

5. A color image data encoding apparatus according to claim 4, wherein said edge detection means is adapted to detect the luminance edge from the difference between the maximum and minimum values of said luminance information.

6. A color image data encoding apparatus according to claim 4, wherein said encoding means comprises:
   arithmetic means for calculating standard deviation, average luminance, and inclination of luminance in the block from the luminance information; and
   means for quantizing these three values, respectively.

7. A color image data encoding apparatus according to claim 4, wherein said encoding means comprises:
   arithmetic means for calculating average of color and inclination of color from the color information; and
   quantizing means for quantizing these two values, respectively.

8. A color image data encoding apparatus for encoding color image data, consisting of luminance information and color information, by the unit of a block of a predetermined size, comprising:
   edge detection means for detecting an edge of the color image data in said block;
   generating means for generating a code of a fixed length indicating the detection of said edge in said block;
   arithmetic means for calculating average in color and inclination in color from said color information;
   encoding means for encoding said luminance information, color average and color inclination respectively into codes of predetermined bit lengths which are variable in accordance with the presence or absence of said edge, respectively; and
   forming means for forming a code from said code of fixed length and said codes of predetermined bit lengths.

9. A color image data encoding apparatus according to claim 8, wherein said encoding means is adapted, when the edge is not detected, not to include a code for said color inclination.

10. A color image data encoding apparatus according to claim 8, wherein said edge detection means is adapted to detect a luminance edge from said luminance information, and said arithmetic means is adapted to calculate the color inclination when the edge is detected.

11. A color image data encoding apparatus according to claim 8, wherein said edge detection means is adapted to detect a luminance edge from the standard deviation of said luminance information.

12. A color image data encoding apparatus for encoding color image data, consisting of luminance data and color data, by the unit of a block of a predetermined size, comprising:
 means for discriminating a presence/absence of an edge in said block using said luminance data; and
 encoding means for encoding said color image data into a code of a predetermined bit length for each block,
 wherein said code includes structure information of said color image data including a part related to inclination of the luminance data, and a length of said part of said structure information is variable in accordance with a discrimination result of said discriminating means.

13. An apparatus according to claim 12, wherein said discriminating means discriminates the presence/absence of an edge in said block using a standard deviation.

14. An apparatus according to claim 13, wherein said discriminating means discriminates the presence/absence of an edge in said block by means of comparing said standard deviation with a predetermined threshold.

15. An apparatus according to claim 12, wherein when said discriminating means discriminates the presence of an edge in said block, said encoding means assigns a longer bit length to said part of said structure information compared with that in a case where said discriminating means discriminates the absence of an edge in said block.

16. An apparatus according to claim 12, wherein said code has further a part including color information.

17. An apparatus according to claim 12, wherein said code has further a part including average luminance information.

18. An apparatus according to claim 12, wherein said structure information includes information related to standard deviation.

19. An apparatus according to claim 12, wherein said code has further a part indicating the presence/absence of an edge in said block.

20. A color image data encoding method for encoding color image data, consisting of luminance data and color data, by the unit of a block of a predetermined size, comprising the steps of:
 discriminating a presence/absence of an edge in said block using said luminance data; and
 encoding said color image data into a code of a predetermined length on each side block,
 wherein said code includes structure information of the color image data including a part related to inclination of the luminance data, and a length of the part of said structure information is variable in accordance with a discrimination result of said discriminating means.

21. A method according to claim 20, wherein when there is an edge in said block, the part of said structure information is longer, compared with that in case of absence of an edge in said block.

22. A method according to claim 20, wherein said code has further a part including color information.

23. A method according to claim 20, wherein said code has further a part including average luminance information.

24. A method according to claim 20, wherein said structure information includes information related to standard deviation.

25. A method according to claim 20, wherein said code has further a part including the presence/absence of an edge in said block.

26. A color image data encoding apparatus for encoding color image data, consisting of luminance information and color information, by the unit of a block of a predetermined size, comprising:
 edge detection means for detecting a luminance edge from a standard deviation of said luminance information;
 encoding means for encoding said luminance information and said color information into codes of predetermined bit lengths which are variable in accordance with the presence or absence of said edge, respectively; and
 forming means for forming a code from said codes of predetermined bit lengths.

27. An apparatus according to claim 26, wherein when said edge is detected, said encoding means encodes said luminance information with a longer bit length compared with that in case of absence of said edge.

28. An apparatus according to claim 26, wherein said encoding means comprises arithmetic means for calculating color average in color and inclination in color from the color information, and quantizing means for quantizing these two values, respectively.

29. A color image data encoding apparatus for encoding color image data, consisting of luminance information and color information, by the unit of a block of a predetermined size, comprising:
 edge detection means for detecting an edge of the color image data in said block, based on said luminance information;
 encoding means for encoding said luminance information and said color information into codes of predetermined bit lengths which are variable in accordance with the presence or absence of said edge, respectively; and
 forming means for forming a code from said codes of predetermined bit lengths,
 wherein said encoding means comprises:
 arithmetic means for calculating standard deviation, average luminance, and inclination of luminance in the block from the luminance information; and
 means for quantizing these two values, respectively.

30. An apparatus according to claim 29, wherein when said edge is detected, said encoding means encodes said luminance information with a longer bit length compared with that in case of absence of said edge.

31. An apparatus according to claim 30, wherein said encoding means comprises arithmetic means for calculating color average in color and inclination in color from the color information, and quantizing means for quantizing these two values, respectively.

32. A color image data encoding apparatus for encoding color image data, consisting of luminance data and color data, by the unit of a block of a predetermined size, comprising:

means for discriminating a presence/absence of an edge in said block using said luminance data; and encoding means for encoding said color image data for each block, wherein said encoding means varies a method of encoding of said color image data in accordance with a discrimination result of said discriminating means.

33. An apparatus according to claim 32, wherein said encoding means encodes said color image data into a code of predetermined bit length.

34. An apparatus according to claim 33, wherein said code has a part of structure information including inclination of luminance.

35. An apparatus according to claim 34, wherein said encoding means varies a method of encoding in such a manner that a bit length to be assigned to the part of said structure information is variable in accordance with a discrimination result of said discriminating means.

36. An apparatus according to claim 33, wherein said code has a part of color information.

37. An apparatus according to claim 36, wherein when said discriminating means discriminates the presence of an edge in said block, said encoding means varies a method of encoding in such a manner that said block is divided on a painting basis with a plurality of colors.

38. An apparatus according to claim 36, wherein said encoding means varies a method of encoding in such a manner that a bit length to be assigned to the part of said color information is variable in accordance with a discrimination result of said discriminating means.

39. A color image data encoding apparatus for encoding color image data, consisting of luminance data and color data, by the unit of a block of a predetermined size, comprising:

edge detection means for detecting a presence/absence of an edge of the color image data in said block, based on said luminance data; and encoding means for encoding said luminance data and said color data into codes of predetermined bit lengths at least one of which is variable in accordance with the presence or absence of said edge.

40. An apparatus according to claim 39, further comprising forming means for forming a code of fixed length from said codes of predetermined bit lengths.

41. A color image data encoding apparatus for encoding color image data, consisting of luminance data and color data, by the unit of a block of a predetermined size, comprising:

edge detection means for detecting an edge of the color image data in said block, based on said luminance data; and encoding means for encoding said luminance data and said color data into codes of predetermined bit lengths, wherein said encoding means varies a method of encoding of said color image data in accordance with a detection result of said edge detection means.

42. An apparatus according to claim 41, wherein when said detecting means detects the edge in said block, said encoding means varies a method of encoding in such a manner that said block is divided on a painting basis with a plurality of colors.

43. An apparatus according to claim 41, wherein when said detecting means does not detect the edge in said block, said encoding means encodes said color data with a longer bit length compared with that in case of detection of said edge.

* * * * *

UNITED STATES PATENT AND TRADEMARK OFFICE
CERTIFICATE OF CORRECTION

PATENT NO. : 4,974,071
DATED : November 27, 1990
INVENTOR(S) : MITSURU MAEDA

It is certified that error appears in the above-identified patent and that said Letters Patent is hereby corrected as shown below:

IN [57] ABSTRACT

Line 8, "of" should read --or--.

COLUMN 1

Line 6, "THE" should read --OF THE--.

COLUMN 3

Line 20, "$X_{11}=\{R_{11}, G_{11}, G_{11}\}$" should read --$X_{11}=\{R_{11}, G_{11}, B_{11}\}$--.

COLUMN 4

Line 63, "$m_{TY}$" should read --$m_Y$--.

COLUMN 5

Line 38, "quotients" should read --to obtain quotients--.
   Line 55, "$Y_{21}$," (second occurrence) should be deleted.

COLUMN 9

Line 20, "$E_Q$, $m_Q$)." should read --($E_Q$, $m_Q$).--.

COLUMN 11

Line      "o" should read --$\sigma_Y$--.

UNITED STATES PATENT AND TRADEMARK OFFICE
CERTIFICATE OF CORRECTION

PATENT NO. : 4,974,071

DATED : November 27, 1990

INVENTOR(S) : MITSURU MAEDA

Page 2 of 2

It is certified that error appears in the above-identified patent and that said Letters Patent is hereby corrected as shown below:

COLUMN 12

Line 16, "($M_{I1}$and" should read --($M_{I1}$ and--.
    Line 46, "$M_I$(" should read --$M_{I1}$--.
    Line 58, "pixel X" should read --pixel $X_{11}$--.

COLUMN 13

Line 47, "$E_I$in" should read --$E_I$ in--.

COLUMN 17

Line 19, "0;($a_1$ < $m_a$)" should read --0;($a_i$ < $m_a$)--.
    Line 24, "AND $B_{a1}$-$B_{a4}$" should read --AND gates 239-242 releases the binary encoded values $B_{a1}$-$B_{a4}$--.

COLUMN 23

Line 58, "side" should be deleted.

Signed and Sealed this

Sixth Day of April, 1993

*Attest:*

STEPHEN G. KUNIN

*Attesting Officer*      *Acting Commissioner of Patents and Trademarks*